United States Patent
Lee et al.

(10) Patent No.: US 7,903,176 B2
(45) Date of Patent: Mar. 8, 2011

(54) APPARATUS FOR PROVIDING MULTIPLE SCREENS AND METHOD OF DYNAMICALLY CONFIGURING MULTIPLE SCREENS

(75) Inventors: Jong-ho Lee, Hwaseong-si (KR); Kwang-kee Lee, Seoul (KR); Un-gyo Jung, Seoul (KR); Glenn A. Adams, Cambridge, MA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1254 days.

(21) Appl. No.: 11/496,480

(22) Filed: Aug. 1, 2006

(65) Prior Publication Data

US 2007/0030394 A1 Feb. 8, 2007

Related U.S. Application Data

(60) Provisional application No. 60/705,491, filed on Aug. 5, 2005, provisional application No. 60/789,577, filed on Apr. 6, 2006, provisional application No. 60/812,090, filed on Jun. 9, 2006.

(51) Int. Cl.
*H04N 5/445* (2006.01)

(52) U.S. Cl. .......................... 348/564; 348/706; 348/588

(58) Field of Classification Search .......... 348/552–570, 348/705, 706, 588, 589, 383; 715/788–801; 345/1.3
See application file for complete search history.

(56) References Cited

U.S. PATENT DOCUMENTS

| | | | |
|---|---|---|---|
| 5,347,624 A | 9/1994 | Takanashi et al. | |
| 5,680,177 A | 10/1997 | Abe | |
| 6,094,230 A | 7/2000 | Han | |
| 6,147,717 A | 11/2000 | Jun | |
| 6,525,775 B1 * | 2/2003 | Kahn et al. | 348/460 |
| 7,114,168 B1 * | 9/2006 | Wyatt et al. | 725/31 |
| 7,659,945 B2 * | 2/2010 | Kim et al. | 348/675 |
| 2002/0147995 A1 | 10/2002 | Kim et al. | |
| 2005/0140574 A1 | 6/2005 | Tamura | |
| 2005/0146485 A1 | 7/2005 | Zerphy et al. | |

FOREIGN PATENT DOCUMENTS

| | | |
|---|---|---|
| CN | 1610308 A | 4/2005 |
| JP | 4-225392 A | 8/1992 |
| JP | 08/079641 A | 3/1996 |
| JP | 9-55898 A | 2/1997 |
| JP | 11-146300 A | 5/1999 |
| JP | 2001-186439 A | 7/2001 |
| KR | 1993-0001436 Y1 | 3/1993 |
| KR | 1998-048945 A | 9/1998 |
| KR | 10-1999-000490 A | 1/1999 |
| KR | 10-2002-0078256 A | 10/2002 |
| KR | 10-2004-0044208 A | 5/2004 |
| KR | 10-2004-0060058 A | 7/2004 |
| KR | 10-2004-0096345 A | 11/2004 |
| WO | WO 96/19895 A1 | 6/1996 |
| WO | 01/75583 A1 | 10/2001 |
| WO | 01/93578 A1 | 12/2001 |
| WO | WO 01/99436 A2 | 12/2001 |

* cited by examiner

*Primary Examiner* — M. Lee
(74) *Attorney, Agent, or Firm* — Sughrue Mion, PLLC

(57) ABSTRACT

An apparatus for providing multiple screens and a method of dynamically configuring multiple screens. The apparatus for providing multiple screens is capable of connecting a plurality of screens to a plurality of output ports so as to dynamically configure the plurality of screens which provide multiple contents on a single physical display device. The apparatus for providing multiple screens includes a service processing module which generates a plurality of screens for displaying received service and an output module which searches an output port connected to the screen.

20 Claims, 23 Drawing Sheets

ABSTRACT SERVICE

NON-ABSTRACT SERVICE

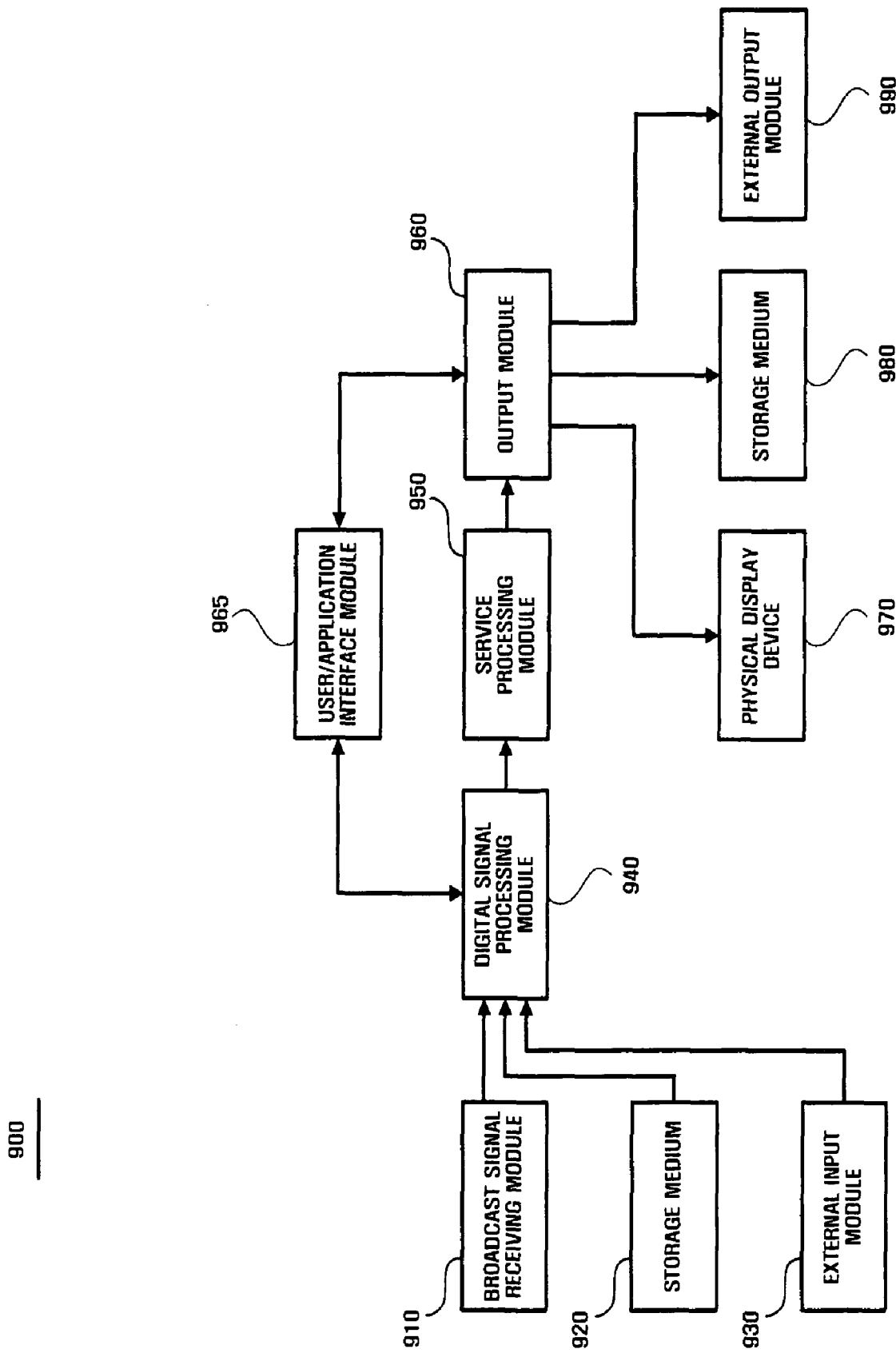

```
...

((MultiScreenContext) screen).getOutputPorts();

```
if(screen instanceof MultiScreenConfigurableContext) {
    MultiScreenConfigurableContext configurableScreen =
    (MultiScreenConfigurableContext) screen;

try {
            configurableScreen.addOutputPort(port)
    } catch(SecurityException e) {
            // MonitorAppPermission( "screencontext" ) not granted
    } catch(IllegalStateException e) {
            // output port change not supported or unable to perform
    }
} else {
    // screen not configurable
}
```

US 7,903,176 B2

APPARATUS FOR PROVIDING MULTIPLE SCREENS AND METHOD OF DYNAMICALLY CONFIGURING MULTIPLE SCREENS

CROSS-REFERENCES TO RELATED APPLICATIONS

This application claims priority from U.S. Provisional Patent Application Nos. 60/705,491, 60/789,577 and 60/812,090 filed on Aug. 5, 2005, Apr. 6, 2006 and Jun. 9, 2006, respectively, in the United States Patent and Trademark Office, the disclosures of which are incorporated herein by reference in their entirety.

BACKGROUND OF THE INVENTION

1. Field of the Invention

Apparatuses and methods consistent with the present invention relate to providing and dynamically configuring multiple screens, and more particularly, to connecting a plurality of screens to a plurality of output ports so as to dynamically configure the plurality of screens which provide multiple contents on a single physical display device.

2. Description of the Related Art

Related art broadcast receivers such as digital televisions (TVs) or digital set-top boxes provide only one content element on a single physical display device or simultaneously display a main screen and a sub-screen on a single physical display device.

Even though related art broadcast receivers can simultaneously display both the main screen and the sub-screen on the same display screen, they can only arrange the main screen and the sub-screen in a limited number of manners. In the case of a content displayed within the main screen, all elements of the content, i.e., video data, audio data, and other data, are displayed. On the other hand, in the case of a content displayed within the sub-screen, only some of the elements of the content are displayed.

Content sources include a broadcast service such as a satellite broadcaster, a terrestrial broadcaster, or a cable broadcaster, a storage medium such as digital versatile discs (DVDs), or an external device connected to an input terminal. However, it is quite difficult to display contents provided by such various content sources on a display screen using the existing broadcast receivers.

In an interactive TV application program environment such as the Multimedia Home Platform (MHP), the Advanced Common Application (ACAP), and the Open Cable Application Platform (OCAP), it is assumed that only one screen is output on a physical display device.

In the interactive TV application program environment, for example, a Home Audio/Video Interoperability (HAVi)-based user interface (UI) is adopted. According to the HAVi UI standard, even though no restriction is imposed on the number of screens displayed on a physical display device, only one screen is generally displayed on a physical display device.

In such an environment, it is difficult to perform operations, such as decoding, digital signal processing, user interaction processing, etc. with respect to one among multimedia contents displayed on a screen while displaying the multimedia contents on independent screens. In addition, it is also difficult to dynamically control the life cycles of application programs and the use of resources in the units of the screens.

Accordingly, there exists a need for a method of displaying a variety of contents on a dynamically configured screen.

SUMMARY OF THE INVENTION

The present invention provides an apparatus and method for dynamic configuration of multiple screens which provide a plurality of contents on a physical display device.

According to an aspect of the present invention, there is provided an apparatus for providing multiple screens, the apparatus including a service processing module generating a plurality of screens for displaying received service and an output module searching an output port connected to the screen.

According to an aspect of the present invention, there is provided an apparatus for providing multiple screens, the apparatus including a service processing module generating a screen on which received service is displayed and an output module changing connection relationship between the screen and the output port connected to the screen.

According to another aspect of the present invention, there is provided a method of providing multiple screens, the method including generating a screen on which received service is displayed and searching an output port connected to the screen.

According to still another aspect of the present invention, there is provided a method of providing multiple screens, the method including generating a screen on which received service is displayed and changing connection relationship between the screen and the output port connected to the screen.

BRIEF DESCRIPTION OF THE DRAWINGS

The above and other aspects of the present invention will become more apparent by describing in detail exemplary embodiments thereof with reference to the attached drawings, in which:

FIG. 10 is a block diagram illustrating a configuration of an apparatus for providing multiple screens according to an exemplary embodiment of the present invention;

FIG. 15 is a state diagram illustrating the operation of the output module according to an exemplary embodiment of the present invention;

FIGS. 16A and 16B are views illustrating an example of a code for searching and changing the output port according to an exemplary embodiment of the present invention.

DETAILED DESCRIPTION OF EXEMPLARY EMBODIMENTS OF THE INVENTION

Figure 1A:
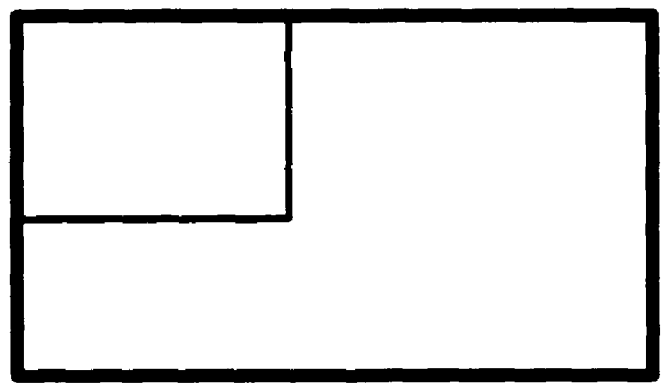
FIGS. 1A to 1H are diagrams illustrating a configuration of a PiP screen according to an exemplary embodiment of the present invention.
Figure 1B:
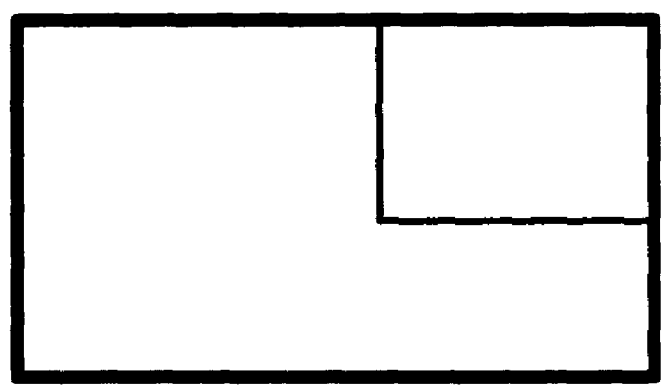
Figure 1C:
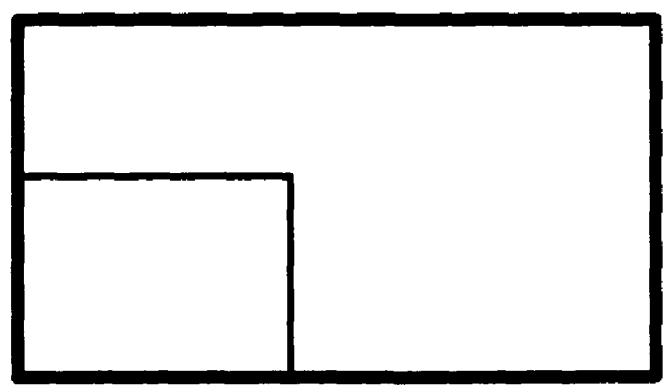
Figure 1D:
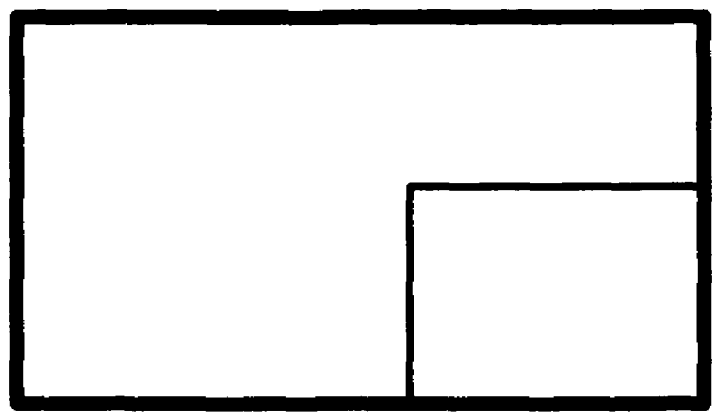

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The present invention is described hereinafter with reference to flowchart illustrations of user interfaces, methods, and computer program products according to exemplary embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks illustrated in succession may in fact be executed substantially concurrently or the blocks may sometimes be executed in the reverse order, depending upon the functionality involved.

For a better understanding of the present invention, the terms used in this disclosure will now be defined.

The term 'service' indicates a group of multimedia contents displayed together, i.e., a group of service components.

Service components are elements of a service and include a video component, an audio component, and a data component. A data component is an application in a service.

Further, the applications are classified into an unbound application and a service bound application. Since the unbound application has a high priority, the resource is smoothly allocated. A monitor application corresponds to a specific unbound application that has the highest priority.

The service bound application is associated to a transport stream, and allows a lower priority than that of the unbound application. The service bound application does not function as a critical system. When a competition for resources is occurred, the service bound application has a larger possibility of abandoning the resource allocation than the unbound application. The service bound application includes a conjunction type that operates in conjunction with a stream that is being transported and a non-conjunction type that operates dependently from the stream.

The term 'service context' indicates an object which can control the executing of a service and includes various resources, devices, and execution state information needed for providing a service.

The term 'physical display device' indicates a physical space which actually displays the content of a service.

The term 'display screen' indicates a screen actually displayed on a physical display device. An arbitrary service may be directly set in the display screen, and the display screen may be displayed on a physical display device. Alternatively, at least one logical screen which is mapped to a certain area of the display screen may be displayed on the physical display device.

The term 'logical screen' indicates a space in which an arbitrary service is displayed. A logical screen is a virtual screen before being mapped to a display screen and thus is not displayed on a physical display device.

The logical screen and the display screen may be a combination of a background still image, a video raster, and a graphic raster. The graphic raster may be a combination of text, lines, colors, and images or a mixture of video frames.

The term 'main service' indicates a service that is selected as a main service through a menu displayed on the physical display device or a remote controller by a user or through an API by an application, and the screen on which the main service is displayed is referred to as a 'main screen'.

The term 'Picture-in-Picture service' (PiP service) indicates a service that is selected as a sub-service in the main service through a menu displayed on a physical display device or a remote controller by a user via an API by an application, and the PiP service may be displayed on a picture-in-picture screen (PiP screen) or a main screen.

Figure 1E:
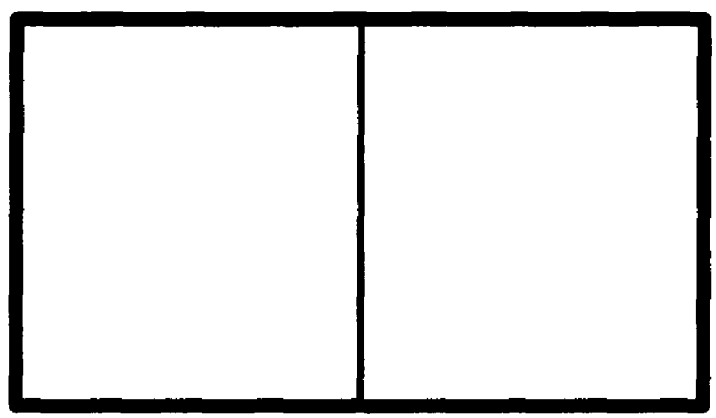
Figure 1F:
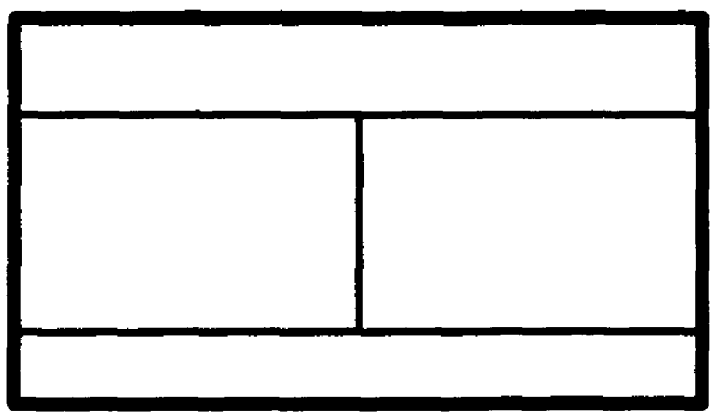
Figure 1G:
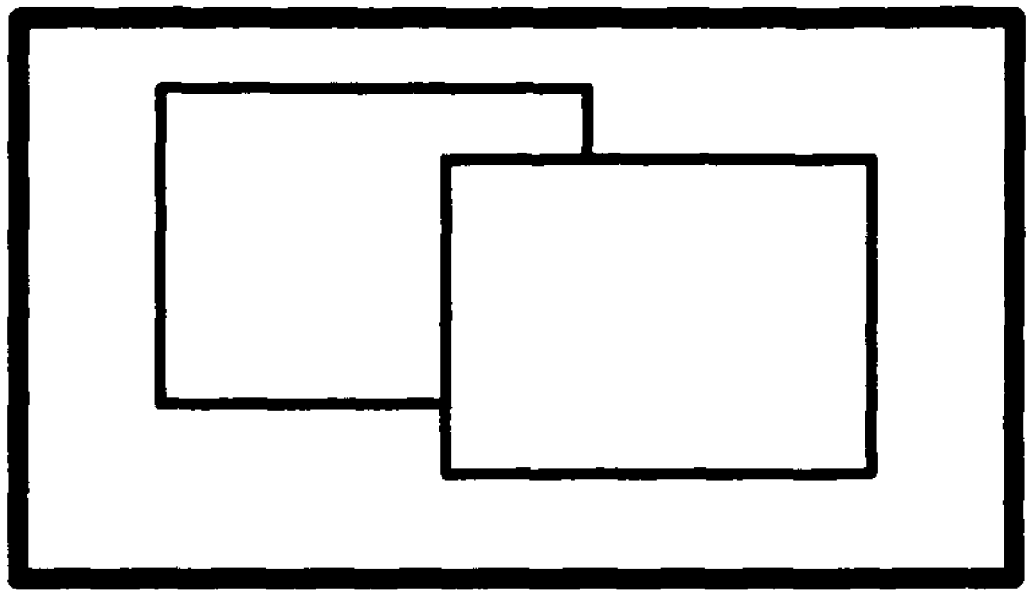
Figure 1H:
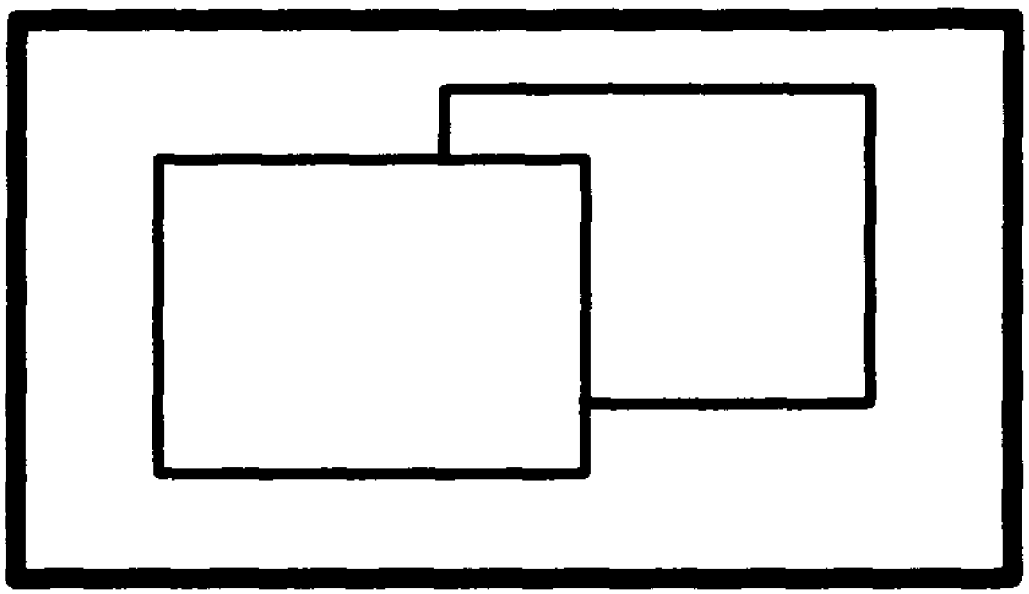

The PiP screen includes a screen that occupies a part of another screen as illustrated in FIGS. 1A to 1D and a screen that is simultaneously displayed with another screen without overlapping the other screen as illustrated in FIGS. 1E to 1F. In this case, it is understood that the PiP screen may include a screen that is displayed on an arbitrary location or area in the physical display device or overlaps another screen, as illustrated in FIGS. 1G and 1H.

Figure 2:
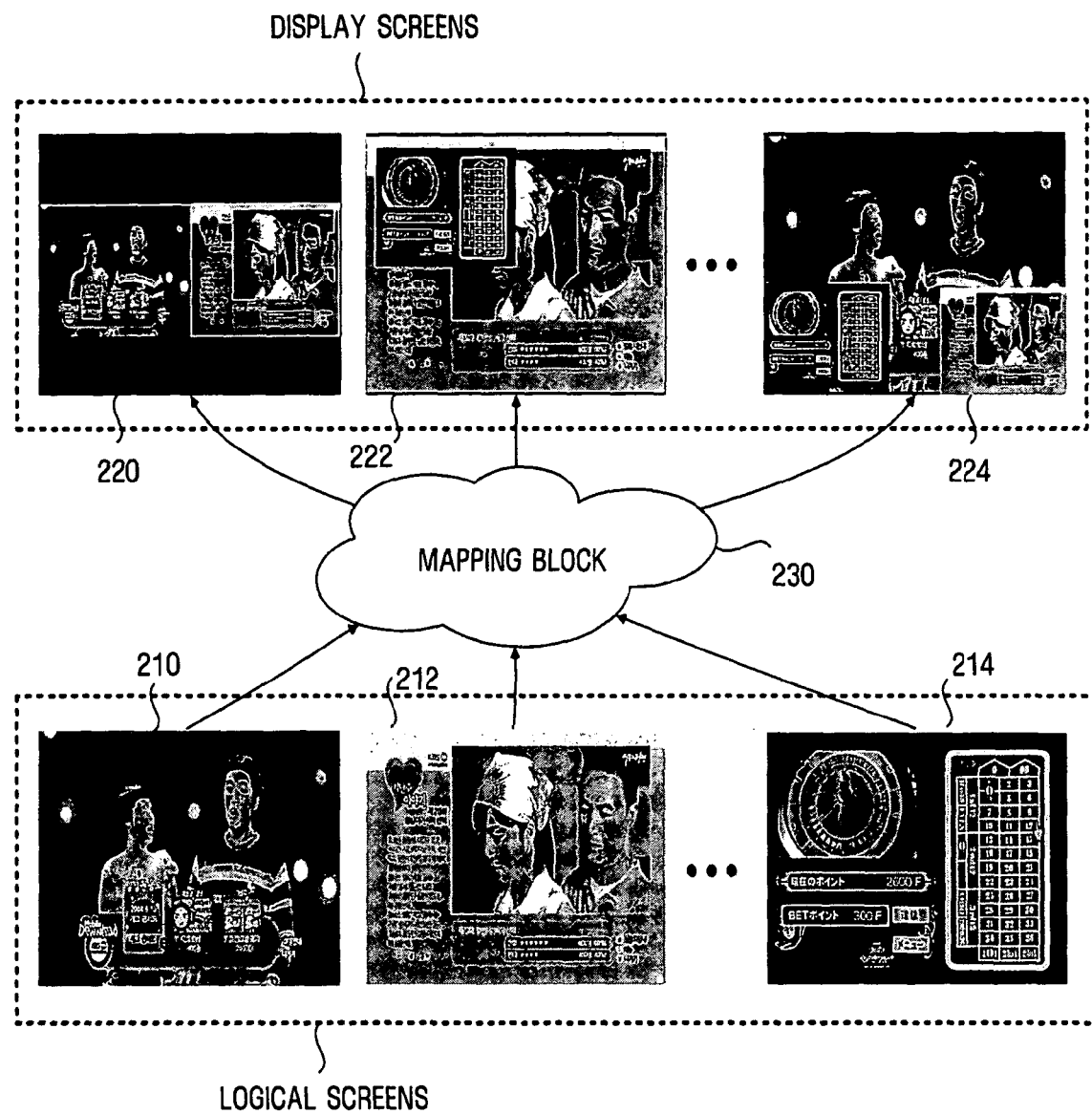
FIG. 2 is a diagram illustrating the relationship between a logical screen and a display screen according to an exemplary embodiment of the present invention.

FIG. 2 is a diagram illustrating the relationship between a logical screen and a display screen according to an exemplary embodiment of the present invention.

Referring to FIG. 2, a service may be displayed using logical screens 210, 212, and 214. The logical screens 210, 212, and 214 are mapped to display screens 220, 222, and 224 through a mapping block 230.

In detail, the logical screens 210 and 212 are mapped to the display screen 220, the logical screens 212 and 214 are mapped to the display screen 222, and the logical screens 210, 212, and 214 are mapped to the display screen 224.

In short, at least one logical screen which displays a service is mapped to an arbitrary area of a display screen.

The mapping block 230 is a group of various pieces of information needed for mapping a logical screen to a display screen. Examples of the various pieces of information include coordinate information of a predetermined area on a display screen to which each of a plurality of logical screens is mapped, identification information of the logical screens and the display screen, and information specifying in what order the logical screens are displayed on the display screen.

The mapping block 230 can change the size of the logical screen so to be allocated in an arbitrary area of the display screen. That is, the mapping block 230 can perform scaling of the logical screen and allocating of the position thereof, and FIGS. 3A to 3E are diagrams illustrating a configuration of the screen including a mapper as the mapping block.

Figure 3A:
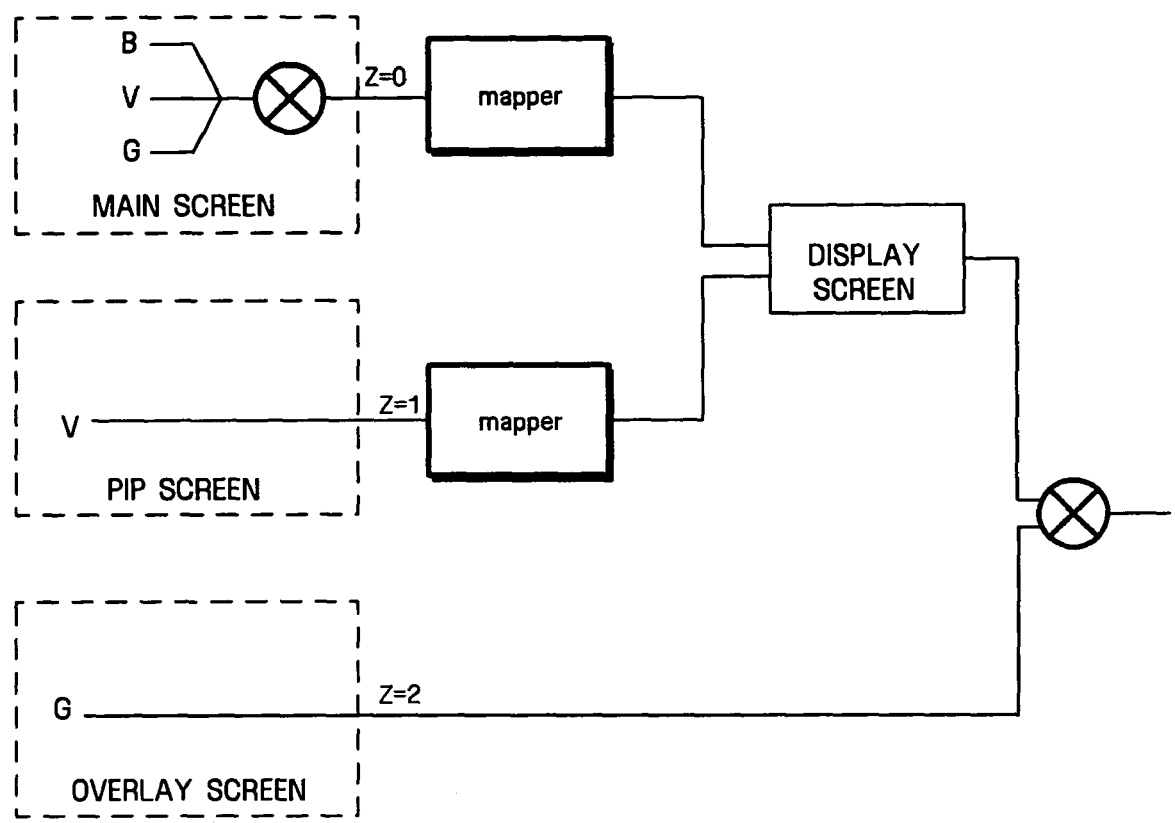
FIGS. 3A to 3E are diagrams illustrating a configuration of a screen including a mapper according to an exemplary embodiment of the present invention.
Figure 3B:
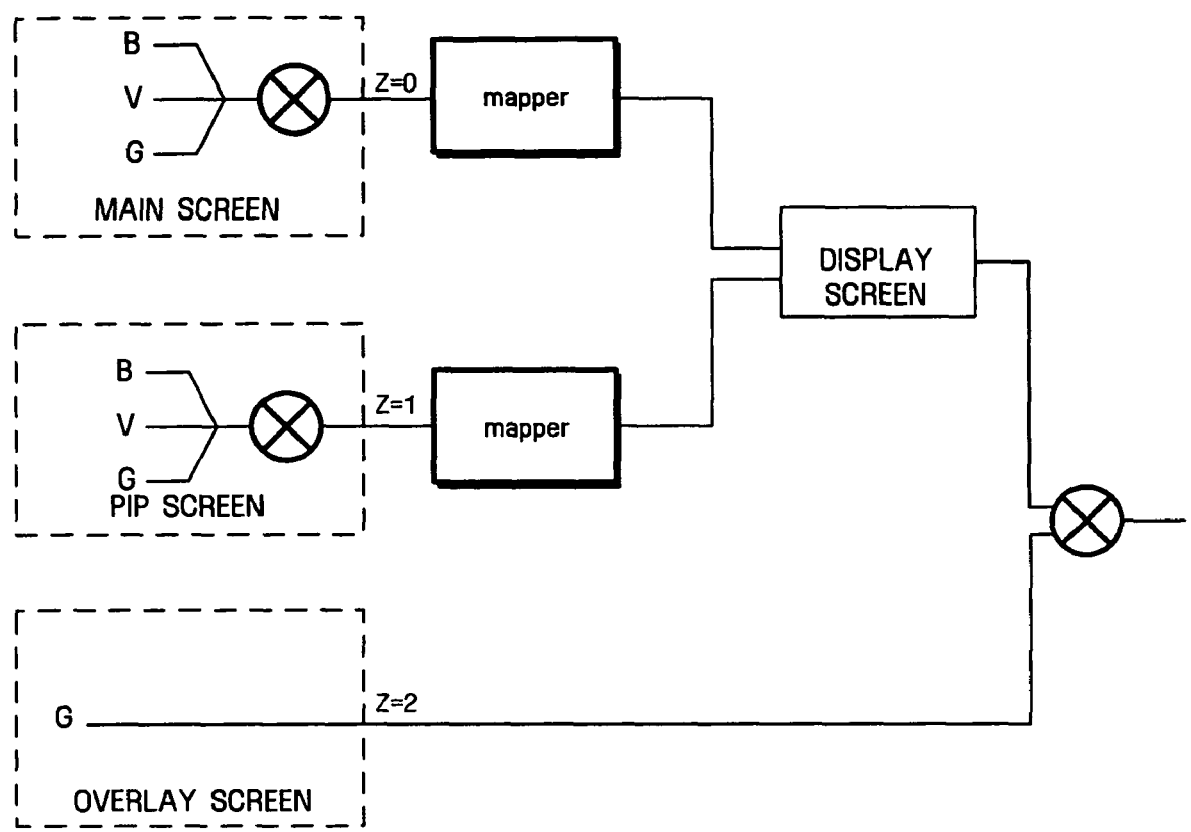

Referring to FIG. 3A, the main screen including a combination of a background still image B, a video raster V, and a graphic raster G is mapped to the entire display screen by a mapper with a normal size. The PiP screen including only video components is mapped to the entire display screen by the mapper with a reduced size. In this case, the mapped PiP screen is displayed on the main screen, which is determined depending on a Z value. The reference character Z refers to z-order value which will be described later. An overlay screen may be combined with the display screen. The overlay screen is a specific screen disposed at the outmost side, and may be used when providing a caption function. The PiP screen may have only a video component as illustrated in FIG. 3A, or may have a combination of the background still image B, the video raster V, and the graphic raster G as illustrated in FIG. 3B.

Figure 3C:
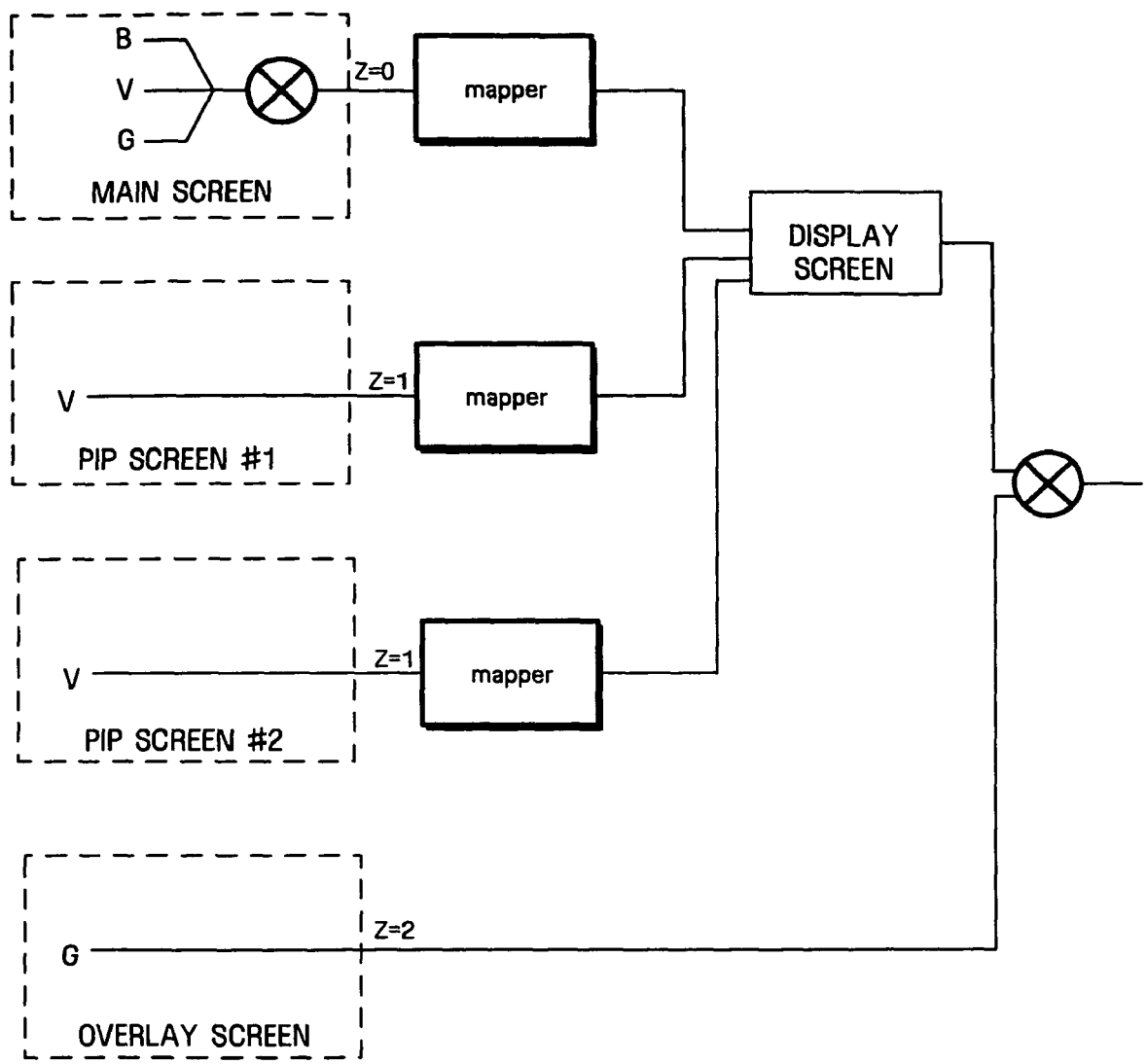
Figure 3D:
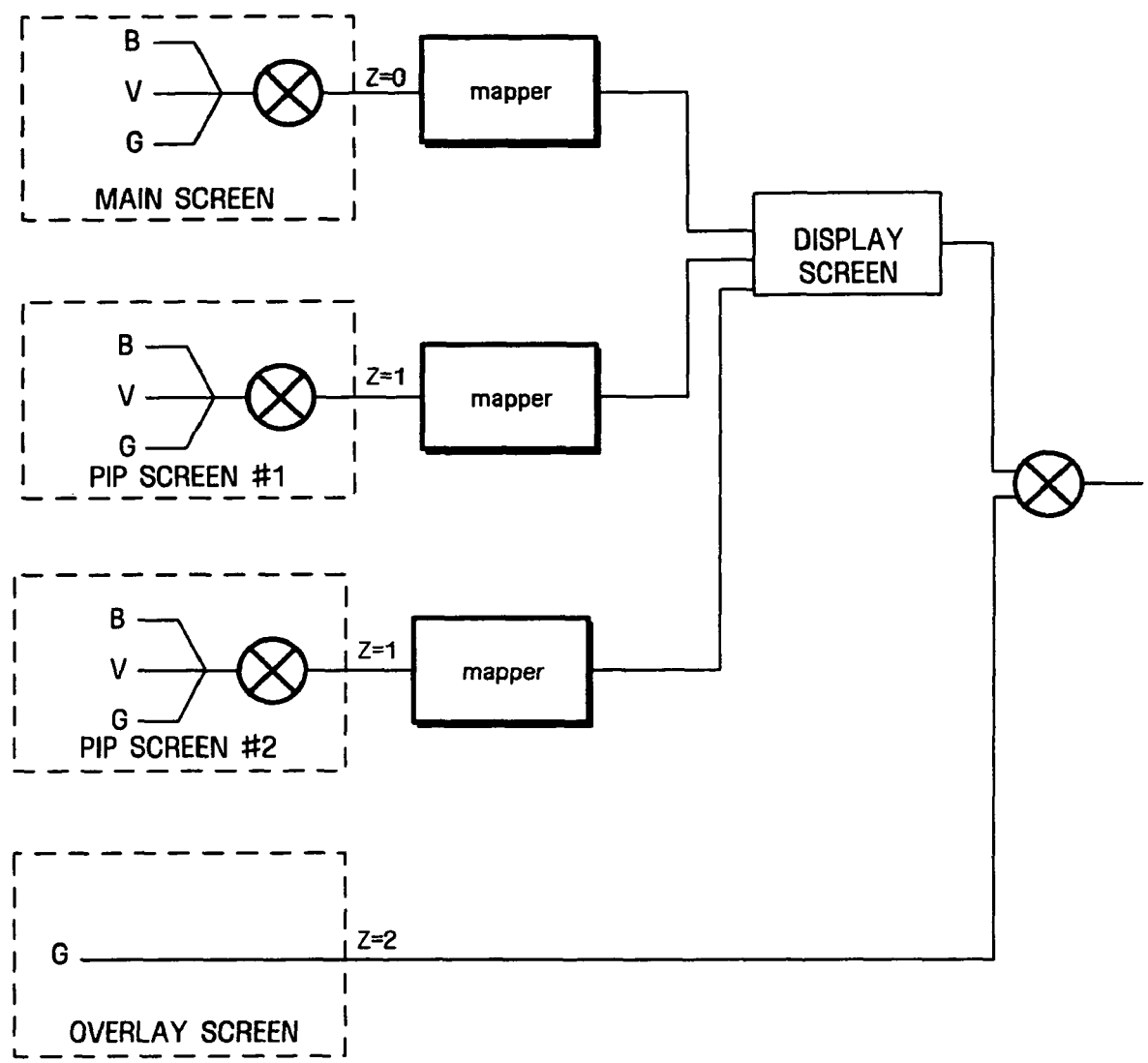

Referring to FIG. 3C, the main screen including the combination of the background still image B, the video raster V, and the graphic raster G is mapped to the entire display screen by the mapper with a normal size. Two PiP screens #1 and #2 having only video component is mapped to an arbitrary area of the display screen by the mapper with a reduced size. In this case, the mapped PiP screen is disposed on the main screen and the Z value can be constantly maintained. Further, the overlay screen may be combined with the display screen. The configuration of the screen may have a plurality of PiP screens including only video components as illustrated in FIG. 3C or a plurality of PiP screens including a combination of the background still image B, the video raster V, and the graphic raster G as illustrated in FIG. 3D.

Figure 3E:
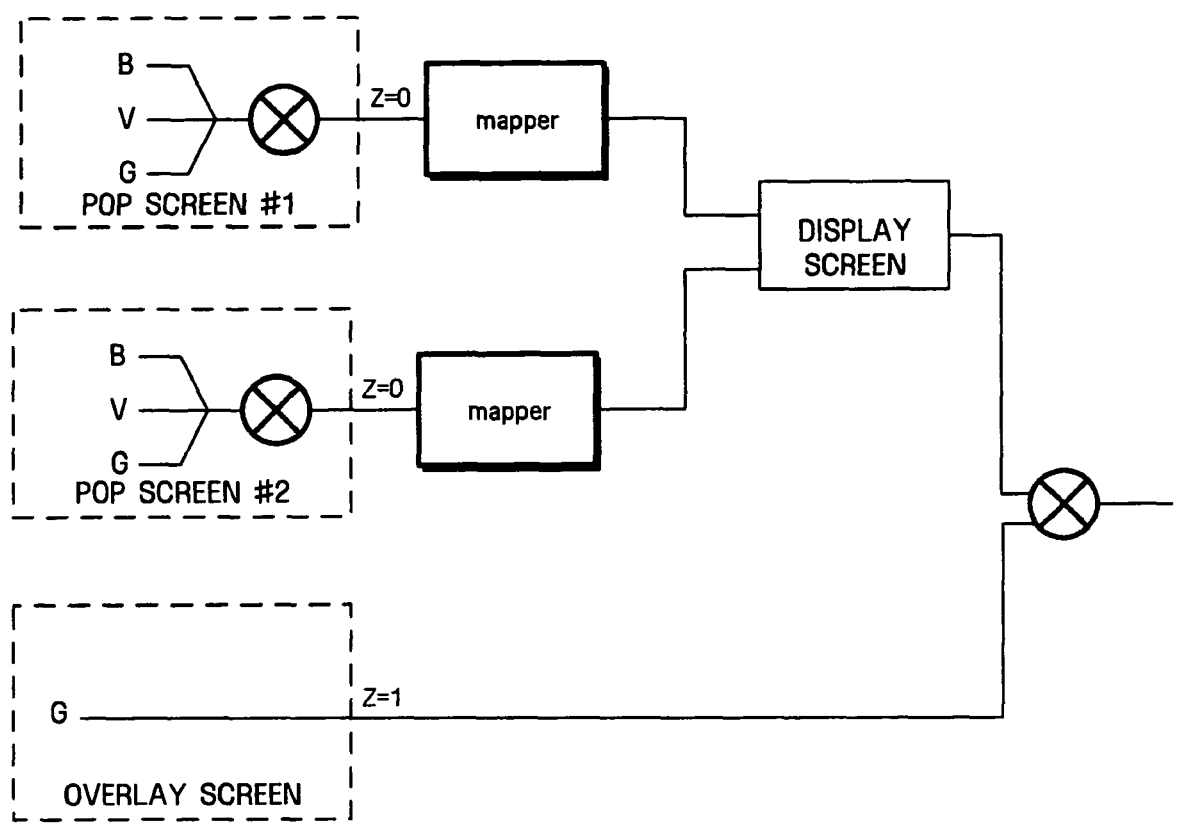

Picture-outside-Picture (POP) screens are illustrated in FIG. 3E. It can be understood that the related art PiP screen is displayed inside the main screen and the POP screen is displayed outside the main screen. Referring to FIG. 3E, the plurality of PiP screens #1 and #2 including a combination of the background still image B, the video raster V, and the graphic raster G are mapped to arbitrary areas of the display screen by the mapper with a reduced size. In this case, the Z value of the mapped POP screens #1 and #2 may be constantly maintained. Further, the overlay screen may be combined with the display screen.

The mapping block 230 may be realized by interfaces or functions prepared by various computer program languages to be executed and create or change the relationship between the logical screen and the display screen by using the above information as parameters.

Also, the mapping block 230 may be realized by a hardware which has a mapping function between a logical screen and a display screen.

Figure 4:
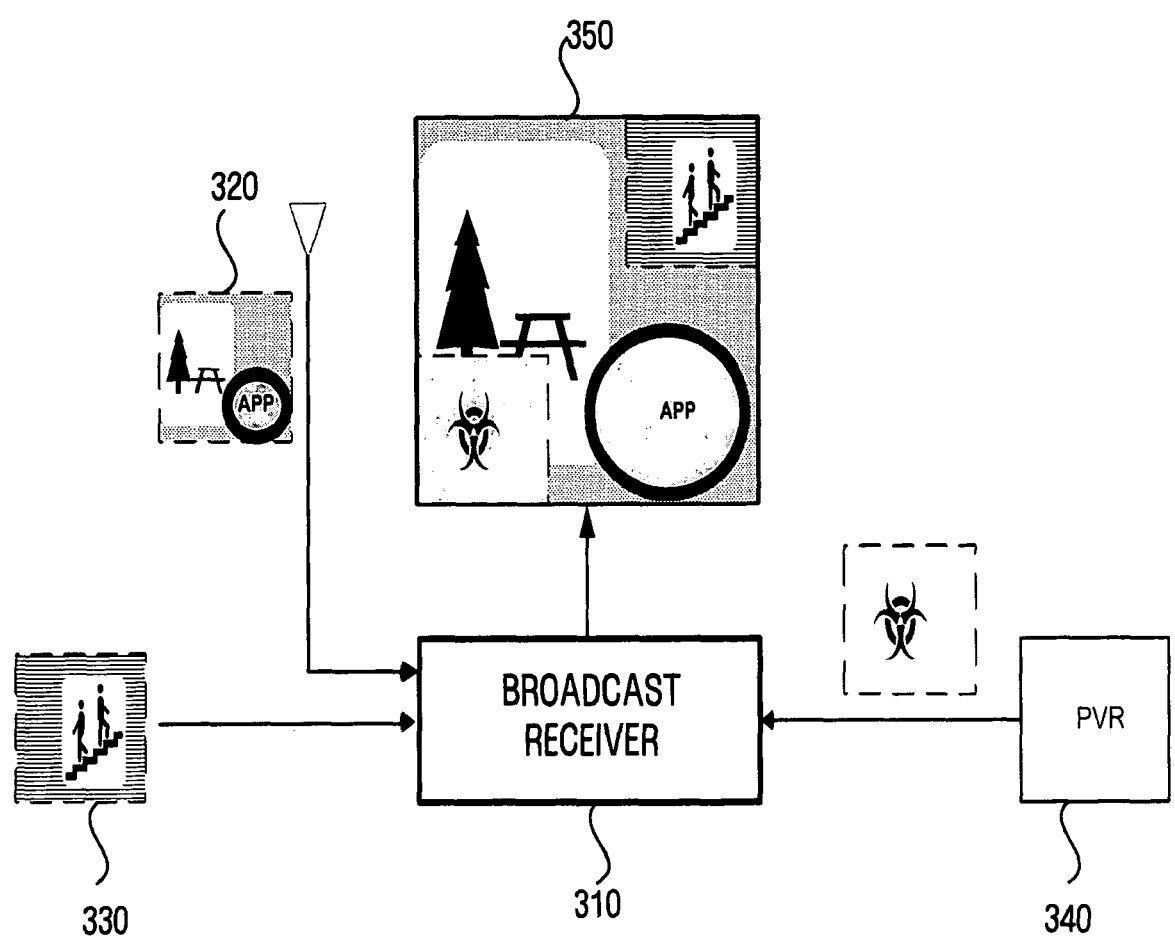
FIG. 4 is a block diagram illustrating service sources according to an exemplary embodiment of the present invention.

Further, services provided by various service sources may be displayed on a display screen, and the display screen may be displayed on a physical display device, as illustrated in FIG. 4.

There are service sources which provide broadcast services such as a terrestrial broadcaster 320 and a cable broadcaster 330, service sources which provide services stored in a storage medium such as a personal video recorder (PVR) 340, and service sources (not illustrated in FIG. 4) which provide services via a wired network or a wireless network.

A broadcast receiver 310 receives services from the service sources and generates logical screens displaying each of the received services.

Then, an arbitrary service is directly set on the display screen to be displayed on a physical display device using a predefined method or a method set by a user or an application. Otherwise, at least one logical screen that is mapped to an arbitrary area on the display screen is displayed on a physical display device 350. In short, services provided by the terrestrial broadcaster 320, the cable broadcaster 330, and the PVR are displayed on the physical display device 350.

The terrestrial broadcaster 320, the cable broadcaster 330, and the PVR 340 are illustrated in FIG. 4 as being service sources, but the present invention is not limited to it. Any type of multimedia content source which provides multimedia contents that can be displayed together can be a service source according to an exemplary embodiment of the present invention.

Figure 5A:
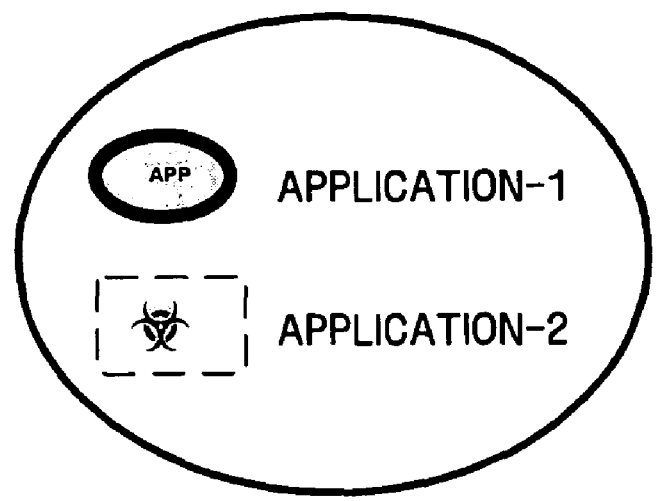
FIGS. 5A and 5B are diagrams illustrating a non-abstract service and an abstract service according to an exemplary embodiment of the present invention.
Figure 5B:
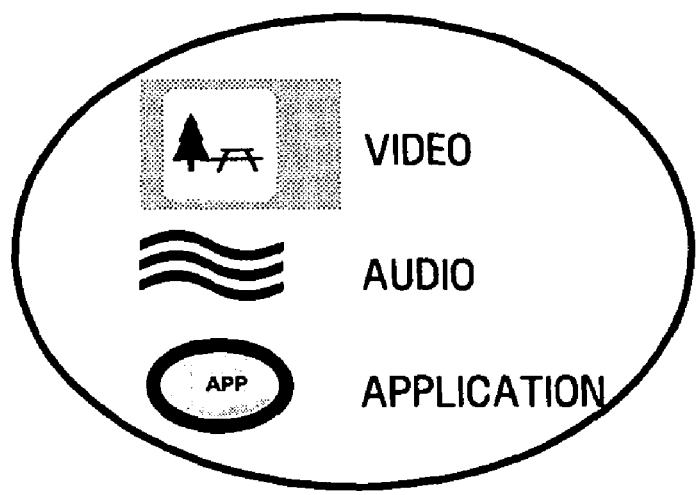

Services according to an exemplary embodiment of the present invention can be classified into abstract services and non-abstract services, as illustrated in FIGS. 5A and 5B.

The abstract services are not services provided by broadcast signals transmitted in real time but services independent of broadcast channels. The abstract services include only data components, i.e., applications, without video components and audio components. Examples of the abstract services include services having unbound applications based on the OCAP standard.

The non-abstract services are understood as services other than abstract services.

According to the current exemplary embodiment of the present invention, both abstract services and non-abstract services have independency. For example, abstract services may be directly set on the physical display device not through logical screens and non-abstract services may be displayed on the logical screens. Then, the logical screens may be mapped to the display screen in which the abstract services are set. Thereafter, the display screen may be output through the physical display device. By doing so, the abstract services can be displayed on the display screen independently of the non-abstract services. In addition, the abstract services and non-abstract services may be mapped to different logical screens. Thereafter, the logical screens may be mapped to a single display screen. In other words, the abstract services can be displayed on the display screen independently of non-abstract services.

According to the current exemplary embodiment of the present invention, the logical screen and the display screen may be categorized as being different objects. Alternatively, a screen may serve as a logic screen or a display screen according to attribute information of one screen object.

In detail, whether a screen object is a logical screen or a display screen depends on the 'type' information among screen object attributes.

The screen object attributes includes 'Type', 'z-Order', 'Display_Area', 'Visibility', 'Associated_Display_Screen', 'Associated_Service_Contexts', and 'OutputPort'.

Figure 6:
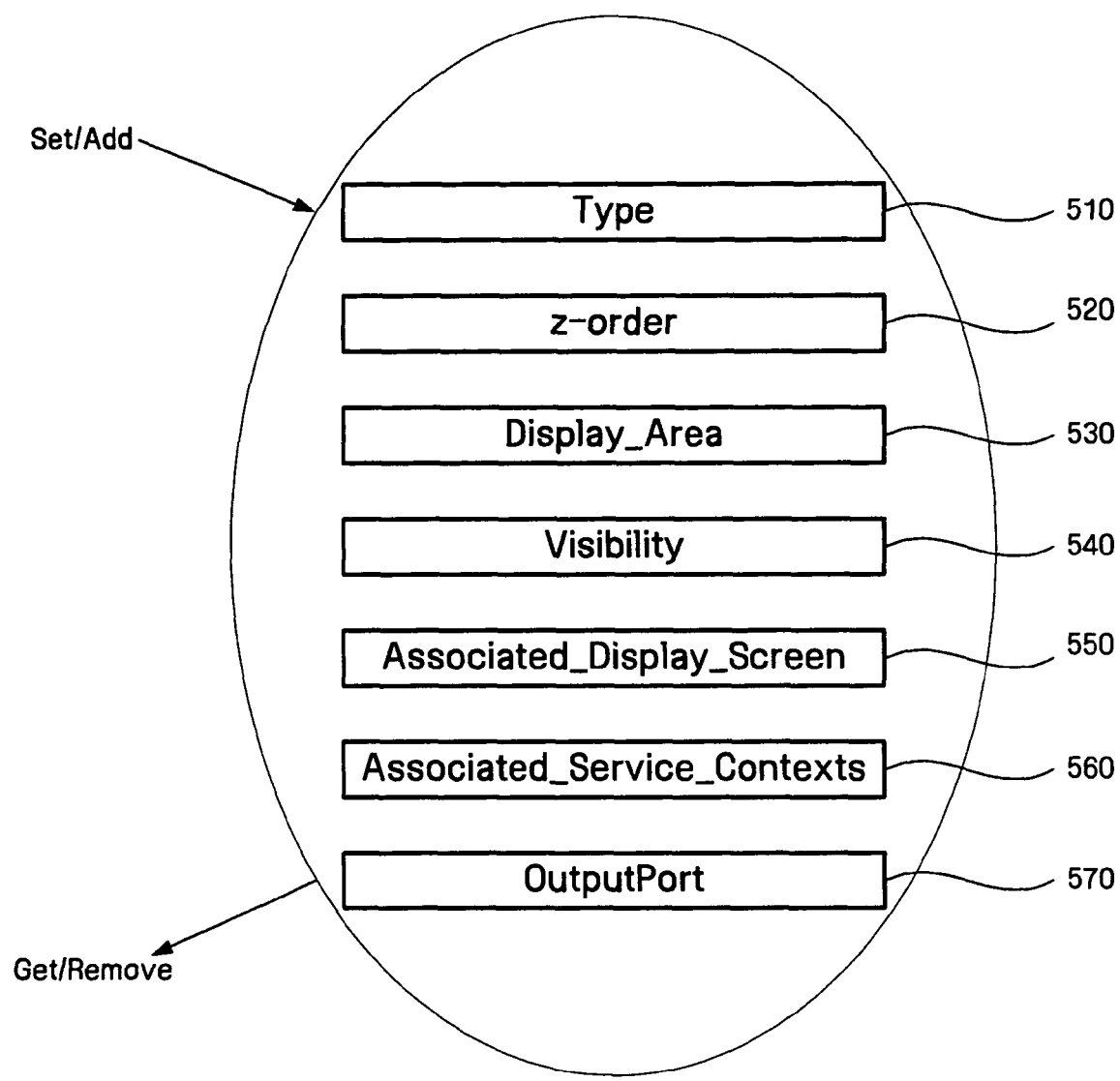
FIG. 6 is a diagram illustrating attribute information and interfaces of a logical screen and a display screen.

FIG. 6 illustrates attribute information of a screen object and interfaces for processing the attributes of the screen.

An attribute 'Type' 510 is for determining a screen type—a logical screen or a display screen.

Figure 7:
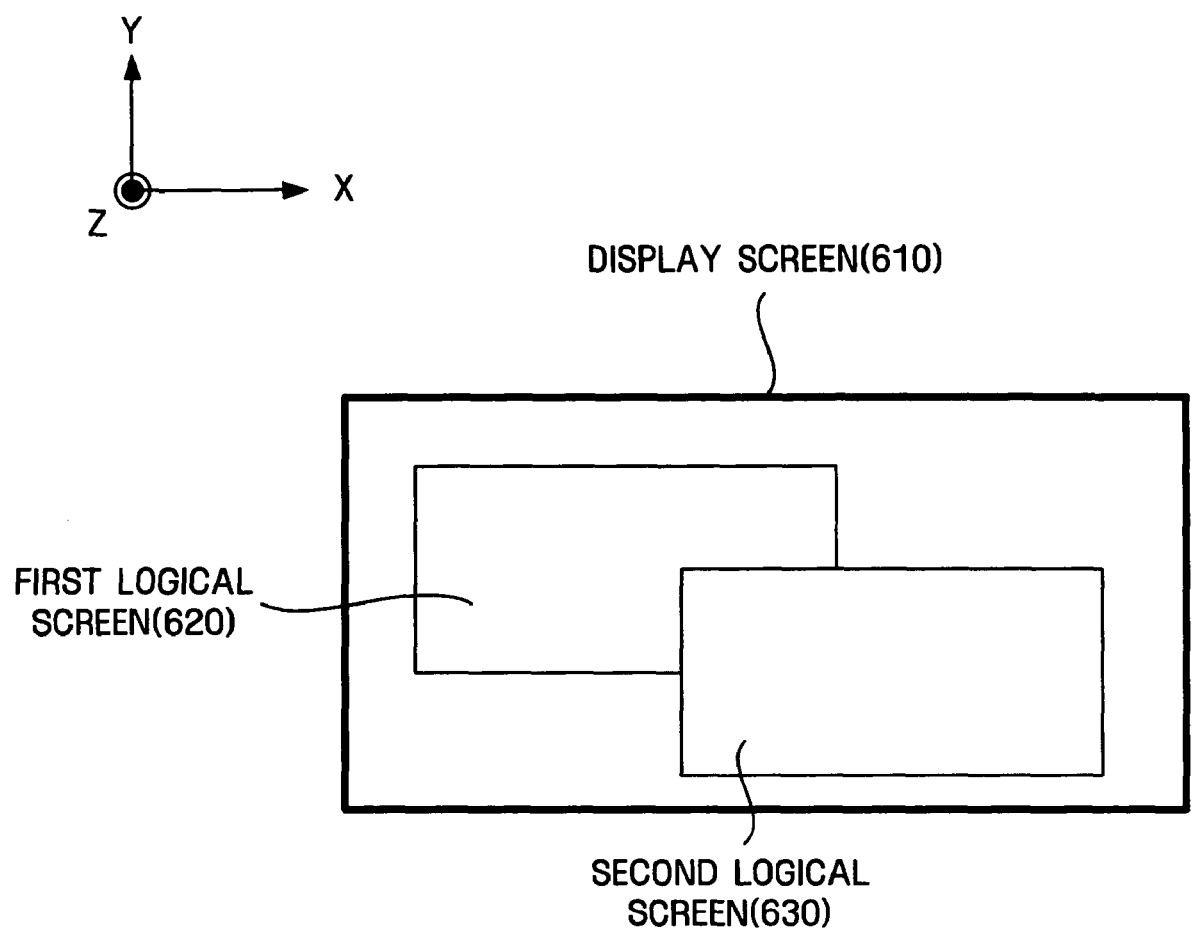
FIG. 7 is a diagram illustrating an attribute 'z-order' of a logical screen according to an exemplary embodiment of the present invention.

An attribute 'z-Order' 520 is for determining in what order a plurality of logical screens are arranged along the z-axis. FIG. 7 illustrates a configuration of logical screens on a physical display device for a combination of the values of attributes 'z-Order' of the logical screens.

Referring to FIG. 7, first and second logical screens 620 and 630 are respectively mapped to predetermined areas of a display screen 610. In detail, the first logical screen 620 is displayed on the display screen 610, and the second logical screen 630 is displayed on the display screen partially overlapping the first logical screen 620. In other words, the display screen 610, the first logical screen 620, and the second logical screen 630 are sequentially arranged in the direction of the z-axis. In this case, an attribute 'z-Order' of the first logical screen 620 may be set to a value of 1, and an attribute 'z-Order' of the second logical screen 630 may be set to a value of 2. The attributes 'z-Order' of the first and second logical screens 620 and 630 may be set to any numbers or characters as long as they can represent a certain order in which the first and second logical screens 620 and 630 are to be arranged along the z-axis.

Figure 8A:
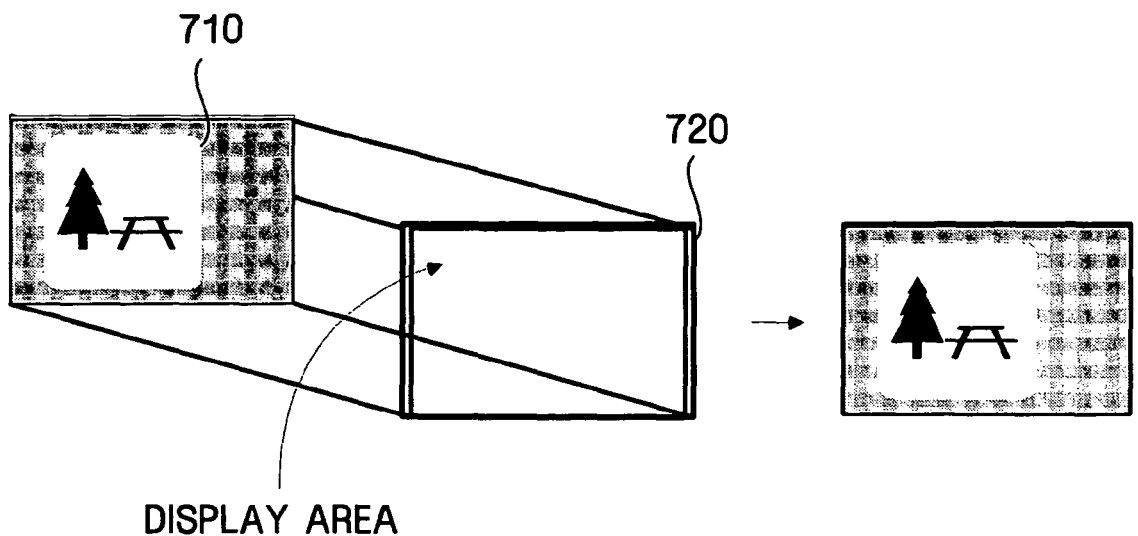
FIGS. 8A and 8B are diagrams each illustrating an attribute 'Display_Area' of a logical screen according to exemplary embodiments of the present invention.
Figure 8B:
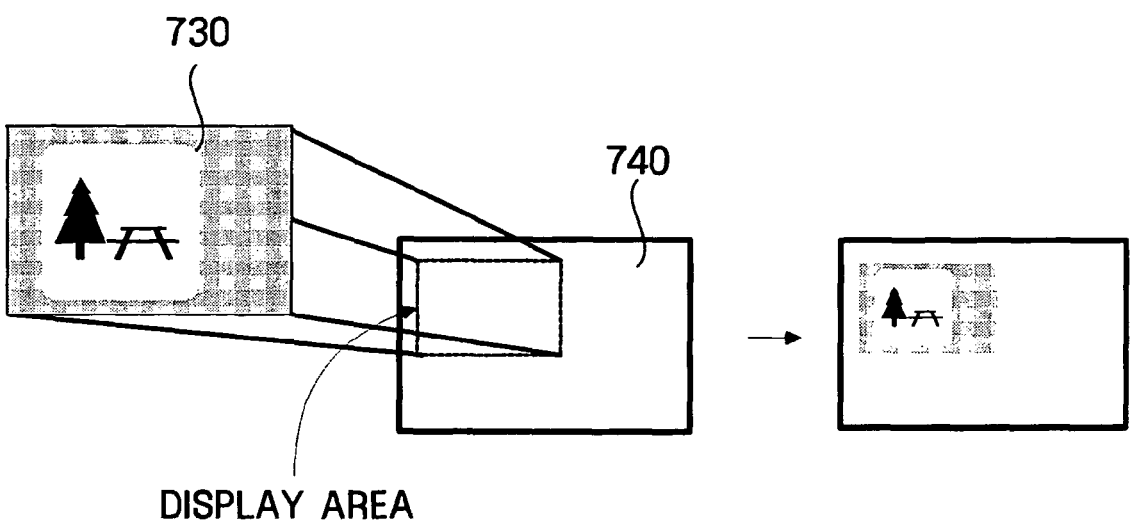

An attribute 'Display_Area' 530 is information regarding a display screen area of a logical screen, as to be illustrated in FIGS. 8A and 8B.

FIG. 8A illustrates that a logical screen 710 is mapped to an entire area of the display screen 720, and FIG. 8B illustrates that a logical screen 730 is mapped to a partial area of the display screen 740.

The attribute 'Display_Area' may include information specifying the two-dimensional coordinates of a predetermined portion of a display screen to which the logical screen is to be mapped or may include information specifying a predetermined location on the display screen and an offset value indicating how much the logical screen deviates from the predetermined location on the display screen.

An attribute 'Visibility' 540 determines whether a logical screen is to be visibly or invisibly displayed on a display screen. It is possible to make a logical screen appear on or disappear from a display screen by altering the value of the attribute 'Visibility' 530.

An attribute 'Associated_Display_Screen' 550 is information regarding display screens associated with a logical screen. A logical screen which is not associated with any display screens may not be displayed on a physical display device nor be transmitted to external output devices.

An attribute 'Associated_Service_Contexts' 560 is information regarding service contexts connected to a logical screen or a display screen. Services set in such service contexts may be displayed on a logical screen or a display screen.

An attribute 'OutputPort' 570 is information regarding devices by which a display screen is to be output, and such devices include display screens, wired/wireless communication media, and various storage media.

Interfaces for identifying or altering the values of the attributes illustrated in FIG. 6 may be provided. Referring to FIG. 6, the interfaces may include an interface 'SET' for setting attribute values or connecting a logical screen to a display screen, an interface 'ADD' for adding attribute values or connecting a logical screen to a service, an interface 'GET' for identifying attribute values, and an interface 'REMOVE' for deleting attribute values. These interfaces may include processes, functions, procedures, or methods that perform their functions, respectively.

For example, a method 'getDisplayScreen(void)' returns a display screen associated with the current screen. In detail, if the current screen is a logical screen, the method 'getDisplayScreen(void)' returns the associated display screen. If the current screen is display screen, the method 'getDisplayScreen(void)' returns reference information regarding the current screen. Further, if the current screen is a logical screen, but there is no associated screen, the method 'getDisplayScreen(void)' returns a value of 'NULL'.

According to another example, a method 'public void setDisplayArea(HScreenRectangle rect) throws SecurityException, IllegalStateException' provides a function for mapping the current logical screen to a predetermined area of the associated display screen. An instance that is provided as a parameter is of a class 'HScreenRectangle' of a package 'org.havi.ui', and has two-dimensional position information. The execution of the methods 'SecurityException' and 'IllegalStateException' may be conducted as an exceptional operation for the method 'setOutputScreen(HScreen screen)'. The method 'IllegalStateException' may be executed when the current screen is a logical screen or when a portion of a display screen associated with a current logical screen cannot change due to the characteristics of a host platform.

According to still another example, a method 'getOutputArea(void)' returns regional information of a current screen as HScreenRectangle information. If the current screen corresponds to a display screen, the method 'getOutputArea (void)' returns HScreenRectangle information having the same value as HScreenRectangle (0,0,1,1). If the current screen is a logical screen, the method 'getOutputArea(void)' returns information regarding an area on a display screen occupied by the current screen. If the current screen is a logical screen but is not associated with any display screen, the method 'getOutputArea(void)' returns a value 'NULL'.

Certain terms are used throughout the following description to refer to particular interfaces. However, one skilled in the art will appreciate that a particular function is named simply to indicate its functionality. This detailed description of the exemplary embodiments does not intend to distinguish between functions that differ in name but not function.

Figure 9:
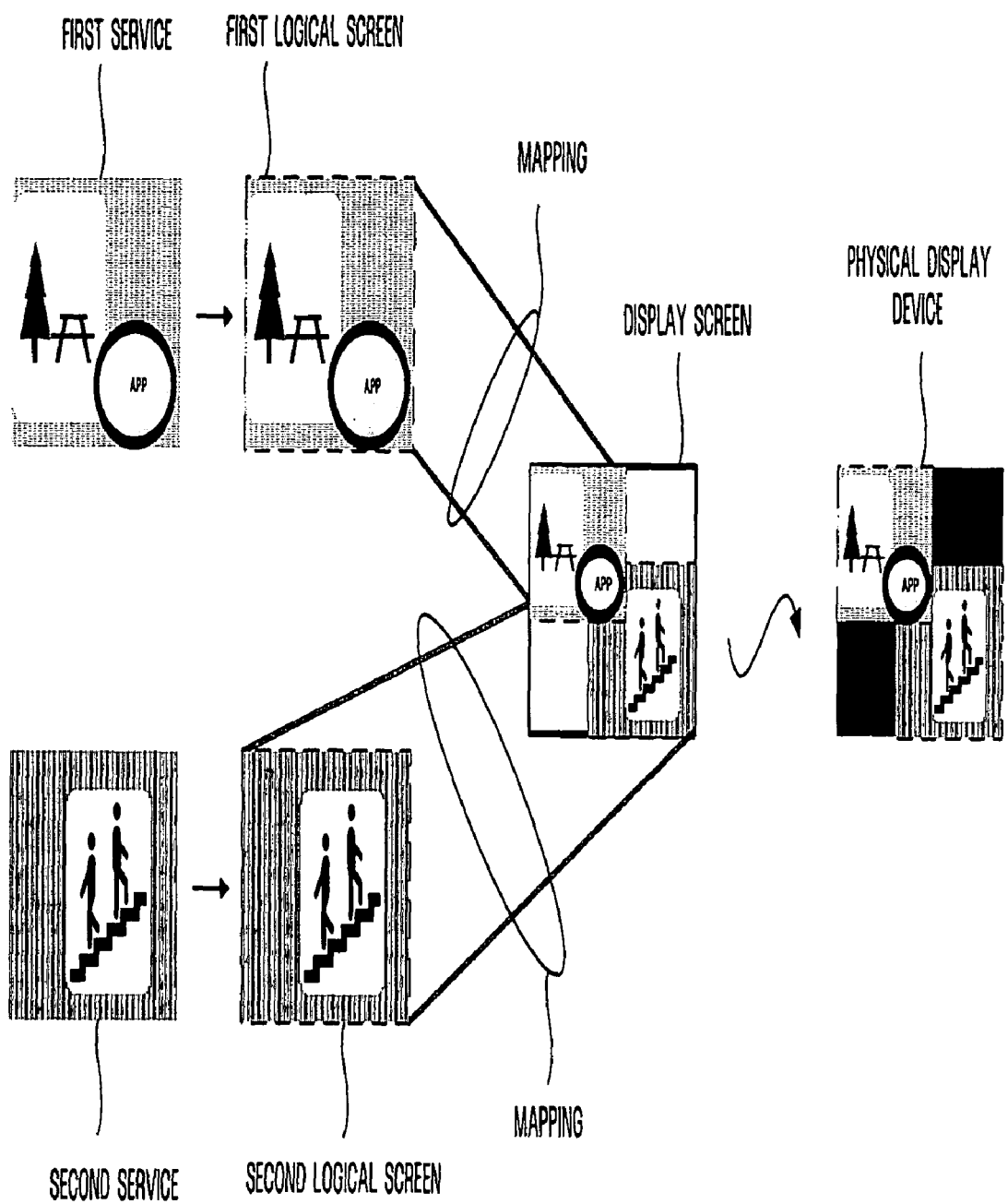
FIG. 9 is a diagram illustrating a method of mapping two services to a display screen according to an exemplary embodiment of the present invention.

FIG. 9 is a diagram illustrating a process that two services are set on two logical screens to be mapped to a single display screen.

Referring to FIG. 9, a first service includes all the three service components, i.e., video, audio, and data components, and a second service includes only video and audio components. However, the present invention does not impose any restrictions on service components, and the first and second services illustrated in FIG. 9 are exemplary.

As illustrated in FIG. 9, the first and second services are displayed on a physical display device in almost the same manner as in the related art. According to the current exemplary embodiment of the present invention, it is possible to display a plurality of services on a physical display device independently of one another without imposing any restrictions on the number of services that can be displayed on a single display screen.

FIG. 10 is a block diagram of an apparatus for providing multiple screens according to an exemplary embodiment of the present invention.

Referring to FIG. 10, an apparatus 900 for providing multiple screens includes a digital signal processing module 940, a service processing module 950, an output module 960, and a user/application interface module 965.

Also, the apparatus 900 includes a broadcast signal reception module 910, a storage medium 920, and an external input module 930 as service sources, and includes a physical display device 970, a storage medium 980, and an external output module 990 as service output media.

The term 'module', as used herein, means, but is not limited to, a software or hardware component, such as a Field Programmable Gate Array (FPGA) or an Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

The digital signal processing module 940 receives various information of a service such as a multimedia content, e.g., video information, audio information, or data information, from the broadcast signal reception module 910, the storage medium 920, or the external input module 930.

The broadcast signal reception module 910 receives a satellite, terrestrial, or cable broadcast signal and transmits the received broadcast signal, the storage medium 920 stores video information, audio information, or data information of a service, and the external input module 930 receives video information, audio information, or data information of a service from an external device such as a network interface module connected to a network.

The digital signal processing module 940 restores a plurality of services using received service components. The restored services include abstract or non-abstract services.

Here, the phrase 'a plurality of services' refers to two or more services transmitted by the broadcast signal reception module 910 or two or more services respectively transmitted by the broadcast signal reception module 910 and the storage medium 920.

The digital signal processing module 940 may restore services according to selection by a user or an application with the aid of the user/application interface module 965. In this case, the user or the application may select the connection between an arbitrary service and a screen.

The service processing module 950 generates one or more logical screen and a display screen to display services restored by the digital signal processing module 940.

The output module 960 maps a plurality of logical screens produced by the service processing module 950 to the display screen. The mapping of the logical screens to the display screen may be conducted using a predefined method or a method set by the user with the aid of the user/application interface module 965.

A service restored by the digital signal processing module 940 may not be processed by the service processing module 950. Instead, a service restored by the digital signal processing module 940 may be directly mapped to a certain portion of a display screen generated by the output module 960.

A display screen provided by the output module 960 may be displayed on the physical display device 970 or may be stored in the storage medium 980. Examples of the storage medium 980 include computer readable floppy discs, hard discs, CD-ROM. DVD, DVD-ROM, BD (Blu-ray Disc), and semiconductor memories.

Also, a display screen provided by the output module 960 may be transmitted to an external device connected to a network via the external output module 990.

For this, the output module 960 may include a plurality of output ports via which a display screen can be provided. In this case, a display screen can be provided via an output port set in advance as a default or an output port chosen by the user with the aid of the user/application interface module 965.

The output module 960 can search an output port connected to a screen. That is, the output module 960 searches an output port connected a predetermined screen among screens generated by the service processing module 950.

The screen connected to the output searched by the output module 960 may be any one of a logical screen on which an application included in a corresponding service is performed or a display screen to which the logical screen is mapped.

In addition, a display screen connected to an output port searched by the output module 960 may be a screen on which an application is performed by mapping the logical screen or a screen on which the application is directly performed without mapping the logical screen.

Further, the output module 960 may generate at least one output port with respect to one screen so as to be mapped with the screen. In other words, a user or an application can transmit contents displayed on the screen to the physical display device 970, the storage medium 980, or the external output module 990 through the user/application interface module 965. At this time, the output module 960 can separately generate output port corresponding to each path and map with the corresponding screen.

Further, the output module 960 can change a connection relationship between the screen and the output port connected to the screen. For example, when the first screen is mapped to the first port and the second screen is mapped to the second port, the output module 960 can connect the first screen to the second port or connect the second screen to the first port on the basis of the selection of the user or the application.

The user or the application can choose one of a plurality of services or restore desired services using the user/application interface module 965. Also, the user can choose one of a plurality of display screens using the user/application interface module 965.

Since the modules illustrated in FIG. 10 are divided according to their functions, it is possible to be connected to the other modules.

Figure 11A:
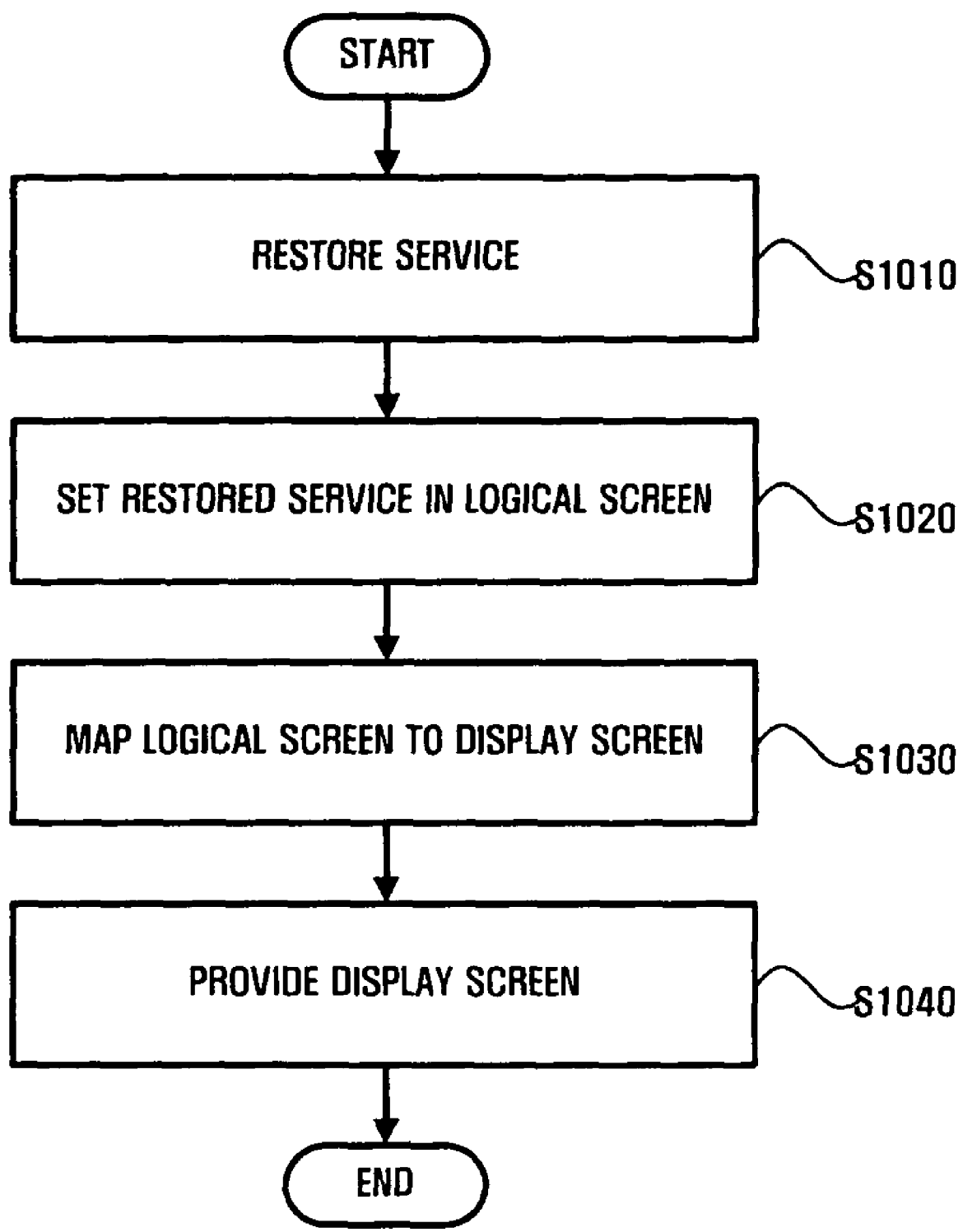
FIGS. 11A and 11B are flowcharts illustrating a method of dynamically configuring the multiple screens according to an exemplary embodiment of the present invention.

FIG. 11A is a flowchart illustrating a method of dynamically configuring multiple screens according to an exemplary embodiment of the present invention.

In general, video information, audio information, and data information constituting a multimedia content are transmitted in a predetermined format, for example, an MPEG stream format. In operation S1010, an apparatus for providing a service such as a multimedia content service receives video information, audio information, and data information and restores a service based on the video information, the audio information, and the data information. Here, the service restored in operation S1010 may be selected or previously determined by a user or an application. The user may use a menu displayed on the display device or a remote controller to select the connections between an arbitrary screen and a screen. The application may select the connections using an API.

Further, data information includes application information regarding application for a service, and this application information includes signal information indicating whether the application can be executed on a PiP screen. Examples of the application information include an application information table (AIT) based on the MHP standard and an eXtended application information table (XAIT) based on the OCAP standard. The signal information may be added to the application information.

Thereafter, in operation S1020, the restored service is set such that it can be displayed on a logical screen. In operation S1030, the logical screen is mapped to a display screen. In operation S1040, the display screen is provided to the user using a display screen, a storage medium, or a network.

Figure 11B:
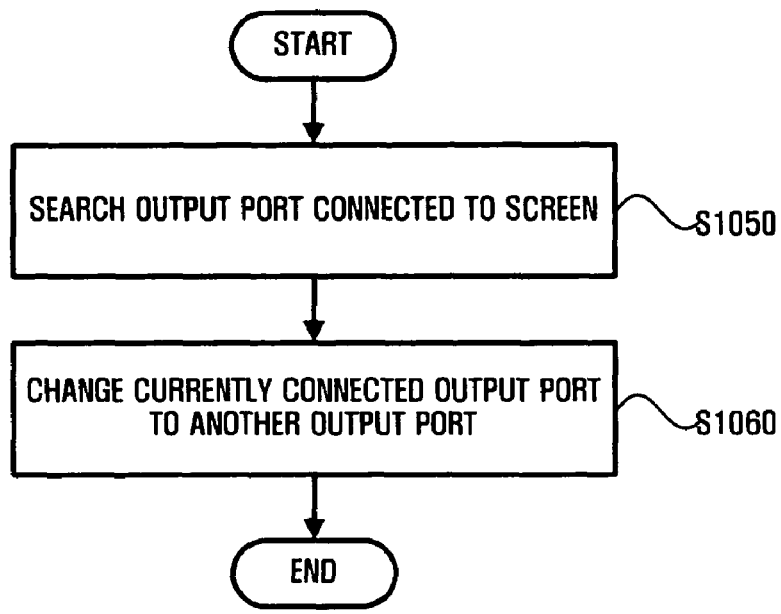

FIG. 11B is a flowchart illustrating the process of searching and changing the output port in detail. In operation S1050, the output module 960 can search an output port connected to the display screen on the basis of a control command from the user or the application. In operation S1060, the output module 960 can change the output port connected to the display screen on the basis of a control command from the user or the application. That is, when the control command is input to search the output port from the user or the application, the output module 960 searches an output port connected to the current display screen. Further, when the control command is input to change the output port from the user or the application, the output module 960 connects the output port connected to the current display screen to another output port so as to change the connection relationship.

The restored service is illustrated in FIGS. 11A and 11B as being displayed on a physical display device via a logical screen. However, the restored service may be directly displayed on a physical display device without passing through the logical screen.

When the user selects the PiP service, the PiP service is realized in two modes. In the first mode, only video component for PiP service selected on the main screen is provided without creating a separate logical screen for PiP service, that is, PiP screen. In the second mode, a separate logical screen for PiP service is created to provide the PiP service selected on the created PiP screen.

FIGS. 11A and 11B illustrate a method of mapping only one service to a display screen for simplicity. However, a plurality of services may be mapped to a display screen with or without passing through a plurality of logical screens.

When a display screen is provided to the user in this manner, the user can perform a plurality of services.

Figure 12:
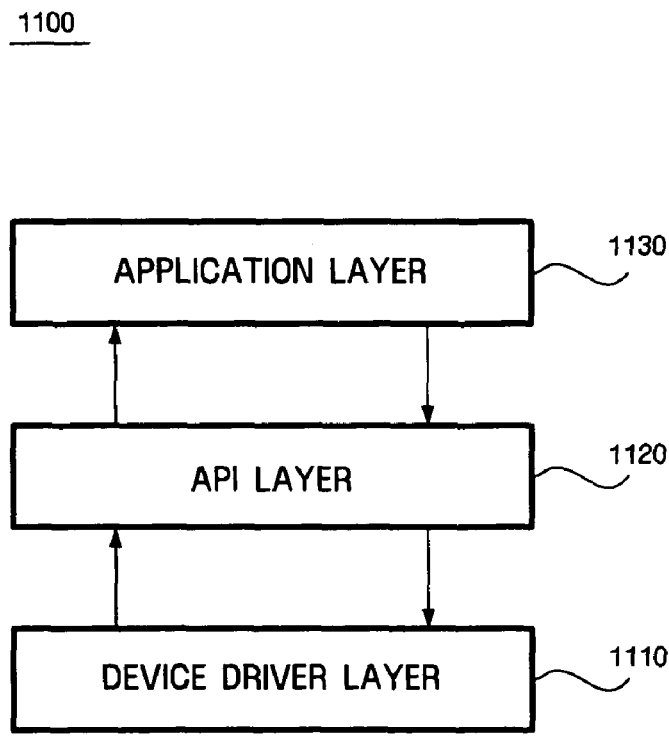
FIG. 12 is a diagram illustrating software architecture for providing multiple screens according to an exemplary embodiment of the present invention.

FIG. 12 is a diagram illustrating software architecture for providing multiple screens according to an exemplary embodiment of the present invention.

Referring to FIG. 12, software architecture 1100 includes a device driver layer 1110, an API layer 1120, and an application layer 1130.

The device driver layer 1110 receives service components from various multimedia content sources and decodes the received service components. Examples of the received service components include video information, audio information, and data information.

The API layer 1120 generates a logical screen and a display screen and maps a service, the logical screen, and the display screen to one another.

The application layer 1130 provides a user interface so that a user can dynamically configure a logical screen which displays a service or transmits a user command to the API layer 1120 so that the API layer 1120 can execute the user command.

The user enables the device driver layer 1110 with the aid of the application layer 1130 to provide a display screen via a physical display device or to store the display screen in a storage medium. In addition, the user can enable the device driver layer 1110 to transmit a display screen to an external device via a network.

For this, the device driver layer 1110 may include a plurality of output ports which can provide a display screen. Otherwise, API layer 1120 may include the plurality of output ports.

Figure 13:
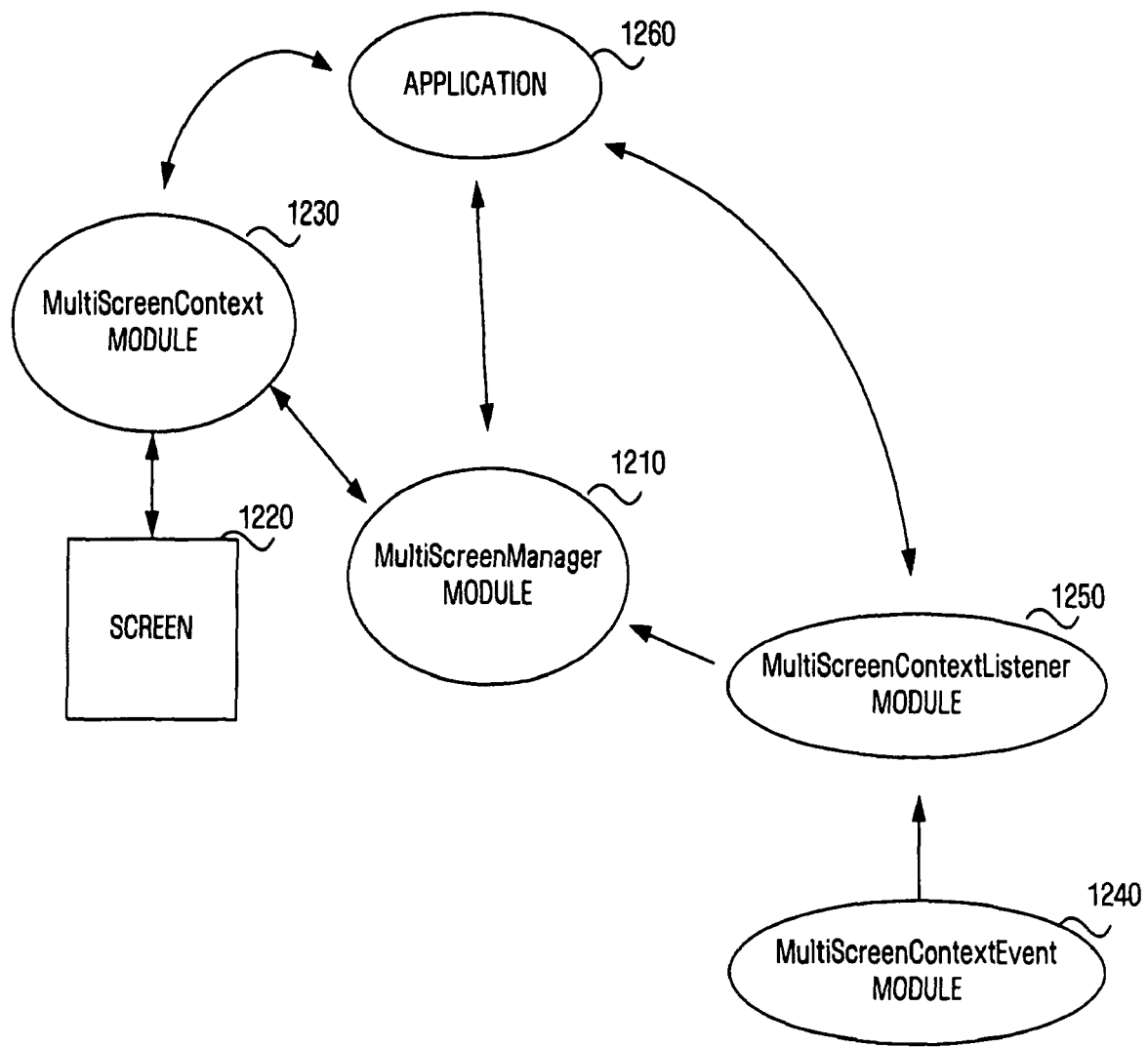
FIG. 13 is a diagram illustrating the relationships among modules constituting an application programming interface (API) layer according to an exemplary embodiment of the present invention.

In order to dynamically configure a plurality of logical screens on a display screen, the API layer 1120 may include a plurality of software modules, e.g., a multiscreen manager module 'MultiScreenManager' 1210, a multiscreen context module 'MultiScreenContext' 1230, a multiscreen context listener module 'MultiScreenContextListener' 1250, and a multiscreen context event module 'MultiScreenContextEvent' 1240, as illustrated in FIG. 13.

The multiscreen manager module 1210 manages the multiscreen context module 1230, searches for a desired screen, displays information specifying what devices are shared by screens, registers the multiscreen context listener module 1250, or cancels the registration of the screen context listener module 1250.

The multiscreen context module 1230 is an interface object associated with a screen object 1220 and determines whether the screen object 1220 is to become a logical screen or a display screen according to an interface operation performed by the multiscreen context module 1230. Various attributes such as the attributes 510 through 570 illustrated in FIG. 6 may be set in the multiscreen context module 1230. The multiscreen context module 1230 can provide the functions 'SET', 'ADD', 'GET', and 'REMOVE' described above with reference to FIG. 6.

When attribute information of the screen object 1220 is altered by the multiscreen context module 1230, the multiscreen context event module 1240 serves as an event class announcing that the attribute information of the screen object 1220 has been changed, and the multiscreen context listener module 1250 serves as a listener interface object which can be realized in a predetermined application class which attempts to receive an event prompted by the multiscreen context event module 1240.

An application 1260 is a module which is driven on the application layer 1130. The application 1260 allows the user to choose a desired service and to freely arrange a plurality of logical screens on a display screen.

In detail, the application 1260 transmits various commands which allow the user to dynamically configure and manage logical screens to the multiscreen manager module 1210, and the multiscreen manager module 1210 controls operations corresponding to the various commands to be executed through the multiscreen context module 1230.

The multiscreen context module 1230 is associated with the screen object 1220 and manages the attribute information of the screen object 1220 illustrated in FIG. 6. In order to manage the attribute information of the screen object 1220, the multiscreen context module 1230 may include a variety of functions or methods.

The multiscreen manager module 1210 receives service components provided by various service sources from the device driver layer 1110 and performs operations to display the received service components on a logical screen or a display screen.

Figure 14:
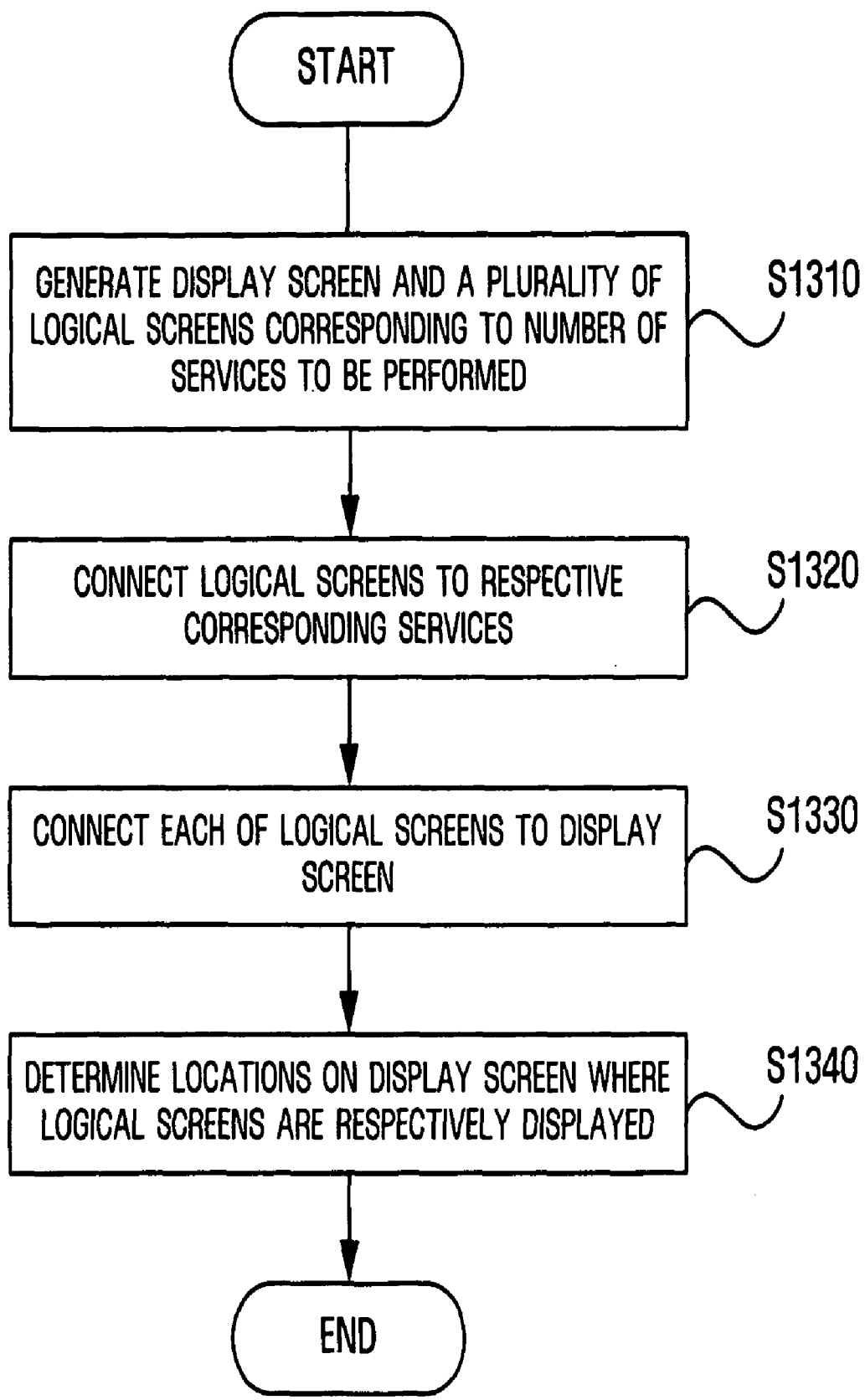
FIG. 14 is a flowchart illustrating the process of displaying a plurality of services on a display screen through logical screens by the modules illustrated in FIG. 13 according to an exemplary embodiment of the present invention.

FIG. 14 is a flowchart illustrating a method of displaying a plurality of services displayed on respective corresponding logical screens by the modules illustrated in FIG. 13 on a display screen according to an exemplary embodiment of the present invention.

Referring to FIG. 14, in operation S1310, the multiscreen manager module 1210 produces a display screen and a number of logical screens corresponding to the number of services to be performed.

In operation S1320, the multiscreen manager module 1210 connects the logical screens to respective corresponding services received from the device driver layer 1110. The multiscreen manager module 1210 may call a method 'addServiceContext' for each of the logical screens by setting service context objects of the received services as parameters for the logical screens services. The method 'addServiceContext' connects a logical screen to a service and may be provided by the multiscreen context module 1230.

In operation S1330, once the logical screens are connected to the respective services, the multiscreen manager module 1210 connects the logical screens to the display screen. At this time, the multiscreen manager module 1210 may call a method 'setDisplayScreen' for each of the logical screens by setting a display screen object to which the logical screens are connected as a parameter. The method 'setDisplayScreen' connects a logical screen to a display screen and may be provided by the multiscreen context module 1230.

A method 'setDisplayScreen' may be set to 'public void setDisplayScreen (HScreen screen) throws SecurityException, Illegal StateException', and this method allows an instance 'HScreen' that is provided as a parameter to be associated with the current logical screen. In this case, the instance 'HScreen' is preferably a display screen.

A parameter of the method 'setDisplayScreen(HScreen screen)' may include a value of 'NULL'. In this case, when the method 'setDisplayScreen(HScreen screen)' is executed without exception handling, the current logical screen is no longer associated with the display screen.

The execution of the methods 'SecurityException' and 'IllegalStateException' may be conducted as an exceptional operation for the method 'setDisplayScreen(HScreen screen)'.

The method 'IllegalStateException' may be executed when a current screen is a logical screen or when a portion of a display screen associated with a current logical screen cannot change due to the characteristics of a host platform.

In operation S1340, areas on the display screen to which the logical screens are to be respectively mapped are determined. At this time, a predetermined method provided by the multiscreen context module 1230 can be called to determine an area on the display screen where the logical screens are to be displayed.

Figures 15, 16A:
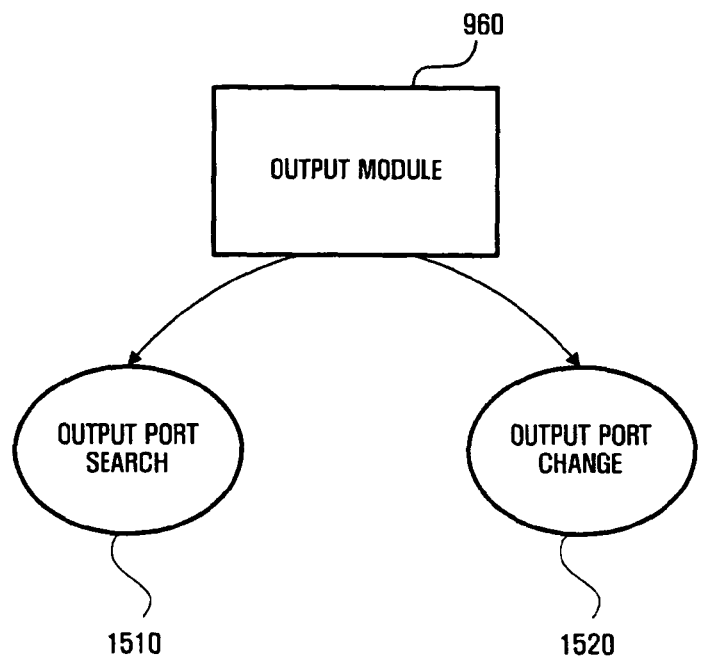

FIG. 15 is a state diagram illustrating the operation of the output module 960 according to an exemplary embodiment of the present invention. The output module 960 can perform an output port search process 1510 and a output port change process 1520.

In order to perform the output port search process 1510, the output module 960 can call a method 'getOutputPorts'. The method 'getOutputPorts' is used to extract a video output port to which the display screen is mapped. The data type of the method 'getOutputPorts' is the same kind of a class 'VideoOutputPort[ ]' of a package 'org.ocap.hardware'. That is, the method 'getOutputPorts' returns sets of an instance 'VideoOutputPort' connected to 'HScreen'.

At this time, in a case that the corresponding screen has two kinds of display screen and is connected to the video output port, the method 'getOutputPorts' returns at least one instance 'VideoOutputPorts'. In a case that the kind of the corresponding screen is the logical screen and the logical screen is connected to the display screen, the method 'getOutputPorts' returns the instance 'VideoOutputPorts' connected to the display screen. Further, in a case that the kind of the corresponding screen is the logical screen and the logical screen is not connected to the display screen, the method 'getOutputPorts' returns a value NULL.

FIG. 16A is a view illustrating an example of a code for searching the output port connected to the screen. In FIG. 16A, the method 'getOutputPorts' is used with respect to a screen object 'screen' of a module 'MultiScreenContext'.

In order to perform the output port change process 1520, the output module 960 can call a method 'addOutputPort' or a method 'removeOutputPort'. The method 'addOutputPort is used to add an instance 'VideoOutputPort' to sets of the video output port that is mapped with the screen and has a parameter 'VideoOutputPort'.

The method 'addOutputPort' can be represented by a form of 'voidaddOutputPort(org.ocap.hardware.VideoOutputPort port) throwsjava.lang.SecurityException, java.lang.IllegalStateException'.

When an exception process of the method 'addOutputPort' is processed and a predetermined right is not given, the exception of the 'java.lang.SecurityException' may be performed. That is, the exception of the 'java.lang.SecurityException' may be performed when the corresponding screen is not a display screen, when the instance 'VideoOutputPort' with respect to the corresponding screen cannot be changed (for example, when a platform is permanently connected to a predetermined set of the instance 'VideoOutputPort'), and when the predetermined instance 'VideoOutputPort' is already connected to the corresponding screen.

The method 'removeOutputPort' is used to remove the instance 'VideoOutputPort' from the set of the video output port that is mapped to the corresponding screen and has a parameter 'VideoOutputPort'.

The method 'removeOutputPort' can be represented by a form of 'voidremoveOutputPort(org.ocap.hardware.VideoOutputPort port) throwsjava.lang.SecurityException, java.lang.IllegalStateException, java.lang.IllegalArgumentException'.

When an exception process of the method 'removeOutputPort' is processed and a predetermined right is not given, the exception of the 'java.lang.SecurityException' may be performed. That is, the exception of the 'java.lang.IllegalStateException' may be performed when the corresponding screen is not a display screen, when the instance 'VideoOutputPort' with respect to the corresponding screen cannot be changed (for example, when a platform is permanently connected to a predetermined set of the instance 'VideoOutputPort'). Further, the exception of the 'java.lang.IllegalStateException' may be performed when the predetermined instance 'VideoOutputPort' is not connected to the corresponding screen.

FIG. 16B is a view illustrating an example of a code for changing the output port connected to the screen. In FIG. 16B, the method 'addOutputPort' is used with respect to a screen object 'screen' of a module 'MultiScreenConfigurableContext'.

Figure 17:
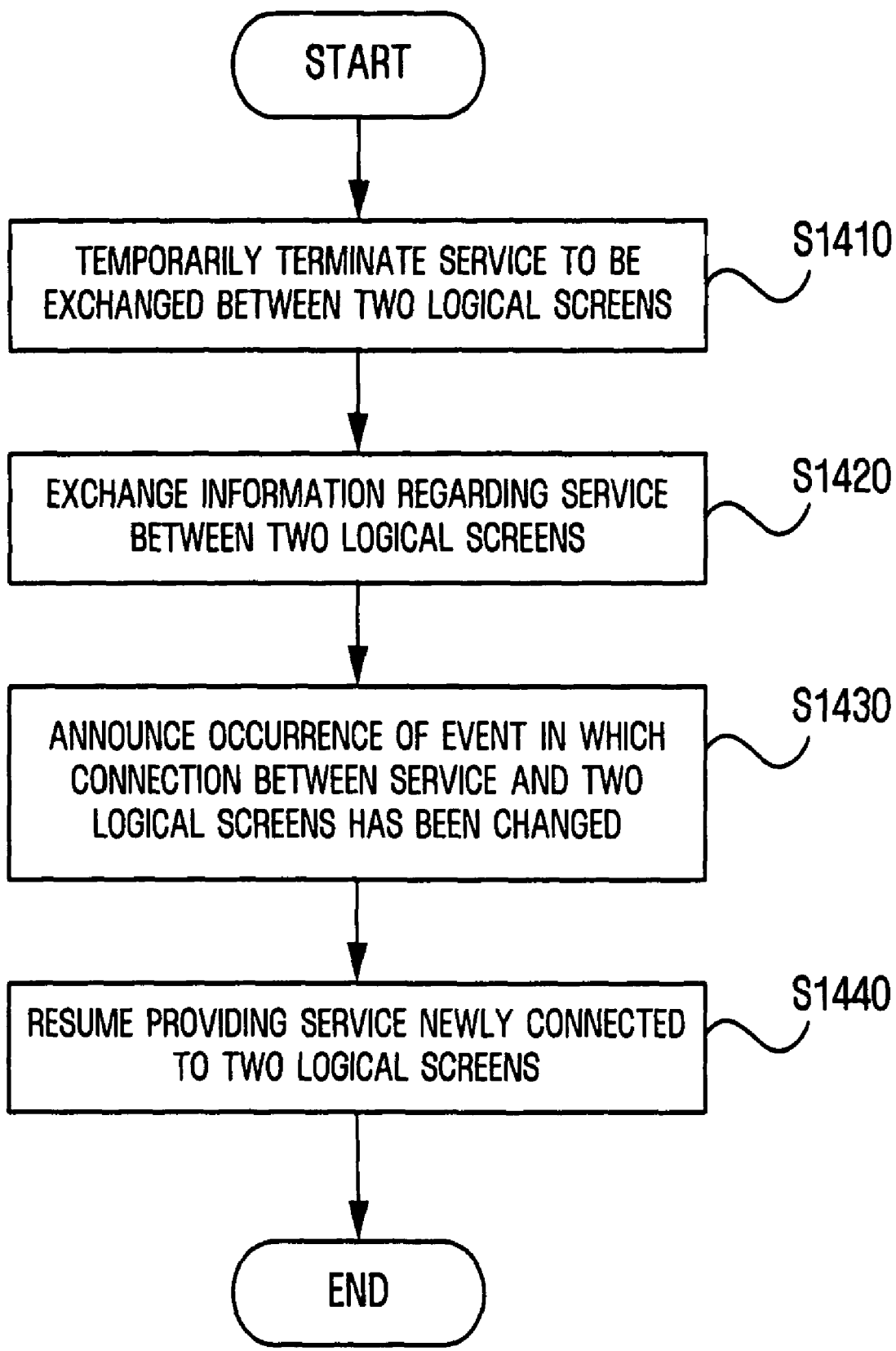
FIG. 17 is a flowchart illustrating the process of changing the plurality of services displayed on the logical screen by the modules illustrated in FIG. 13 according to an exemplary embodiment of the present invention.

FIG. 17 is a flowchart illustrating the process of exchanging the services to be displayed on the logical screen by the modules shown in FIG. 13.

In operation S1410, the multiscreen manager module 1210 temporarily terminates a service to be exchanged between two logical screens.

Thereafter, in operation S1420, information regarding the service is exchanged between the two logical screens. At this time, a method 'removeServiceContext' and a method 'addServiceContext' are called for each of the two logical screens, thereby exchanging service contexts set in the two logical screens between the two logical screens. The method 'removeContext' removes a service context connected to a logical screen, and the method 'addServiceContext' adds a new service context to a logical screen. The methods 'removeServiceContext' and 'addServiceContext' may be provided by the multiscreen context module 1230. According to the current exemplary embodiment of the present invention, service information regarding a service connected to logical services is exchanged between the logical services, thereby obtaining the effect of exchanging a main screen and a sub-screen. In addition, according to the current exemplary embodiment of the present invention, even when three or more services are performed on a display screen, they can be exchanged between an arbitrary number of logical screens.

In operation S1430, occurrence of an event in which the connection between the service and the two logical screens has been changed is generated. Thereafter, in operation S1440, the multiscreen context event module 1240 transmits the event to the multiscreen context listener module 1250, and a service newly connected to the two logical screens begins to be performed.

According to the present invention, in order to dynamically configure a plurality of screens that provide a plurality of contents on a physical display screen, the plurality of screens is connected to various ports different from each other. Therefore, it is possible for a user to use the plurality of screens according to a purpose.

While the present invention has been particularly illustrated and described with reference to exemplary embodiments thereof, it will be understood by those of ordinary skill in the art that various changes in form and details may be made therein without departing from the spirit and scope of the present invention as defined by the following claims. Therefore, it is to be understood that the above-described exemplary embodiments have been provided only in a descriptive sense and will not be construed as placing any limitation on the scope of the invention.

What is claimed is:

1. An apparatus for providing multiple screens, the apparatus comprising:
   a digital signal processing module which receives at least one of a video component, an audio component, and a data component regarding data broadcasting services, and restores services based on the received at least one of the video component, the audio component or the data component;
   a service processing module which generates the multiple screens including a plurality of logical screens and a display screen for displaying the restored services, and associates the restored services to the plurality of logical screens; and
   an output module which associates the plurality of logical screens to the display screen, generates at least one output port for associating with the display screen, and searches an output port associated with the display screen from among the at least one output port, wherein the multiple screens are output to at least one external device via the at least one output port.

2. The apparatus of claim 1, wherein the plurality of logical screens comprises a logical screen to which an application included in the restored services is associated and on which the application is performed.

3. The apparatus of claim 2, wherein the display screen comprises a display screen to which an application included in the restored services is associated and on which the application is executed.

4. The apparatus of claim 1, wherein the plurality of logical screens comprises a Picture-in-Picture screen.

5. The apparatus of claim 1, wherein the plurality of logical screens comprises a Picture-outside-Picture screen.

6. An apparatus for providing multiple screens, the apparatus comprising:
   a digital signal processing module which receives at least one of a video component, an audio component, and a data component regarding data broadcasting services, and restores services based on the received at least one of the video component, the audio component or the data component;
   a service processing module which generates the multiple screens including a plurality of logical screens and a display screen and associates the restored services to the plurality of logical screens; and
   an output module which associates the plurality of logical screens to the display screen, generates at least one output port for associating with the display screen, and changes an association relationship between the display screen and the at least one output port associated to the display screen,
   wherein the multiple screens are output to at least one external device via the at least one output port.

7. The apparatus of claim 6, wherein the plurality of logical screens comprises a logical screen with which an application included in the restored services is associated and on which the application is performed.

8. The apparatus of claim 7, wherein the display screen comprises a display screen to which an application included in the restored services is associated and on which the application is executed.

9. The apparatus of claim 6, wherein the plurality of logical screens comprises a Picture-in-Picture screen.

10. The apparatus of claim 6, wherein the plurality of logical screens comprises a Picture-outside-Picture screen.

11. A method of providing multiple screens, the method comprising:
    receiving a video component, an audio component, or a data component regarding data broadcasting services;
    restoring services based on the video component, the audio component or the data component;
    generating the multiple screens, including a logical screen and a display screen for displaying the restored services;
    associating the restored services with the plurality of logical screens;
    associating the plurality of logical screens with the display screen;
    generating at least one output port for the multiple screens are associated;
    associating the display screen with the at least one output port; and
    searching an output port associated with the display screen from among the at least one output port,
    wherein the multiple screens are output to at least one external device via the at least one output port.

12. The method of claim 11, wherein the plurality of logical screens comprises a logical screen with which an application included in the restored services is associated and on which the application is performed.

13. The method of claim 11, wherein the display screen comprises a display screen to which an application included in the restored services is associated and on which the application is executed.

14. The method of claim 11, wherein the plurality of logical screens comprises a Picture-in-Picture screen.

15. The method of claim 11, wherein the plurality of logical screens comprises a Picture-out of-Picture screen.

16. A method of providing multiple screens, the method comprising:

receiving a video component, an audio component, or a data component regarding data broadcasting services;

restoring services based on the video component, the audio component or the data component;

generating the multiple screens, including a logical screen and a display screen, for displaying the restored services;

associating the restored services with the plurality of logical screens;

associating the plurality of logical screens with the display screen;

generating at least one output port for the multiple screens are associated;

associating the display screen with the at least one output port; and changing an association relationship between the display screen and the at least one output port associated to the display screen, wherein the screen multiple screens are output to at least one external device via the at least one output port.

17. The method of claim 16, wherein the plurality of logical screens comprises a logical screen with which an application included in the restored services is associated and on which the application is performed.

18. The method of claim 17, wherein the display screen comprises a display screen to which an application included in the restored services is associated and on which the application is executed.

19. The method of claim 16, wherein the plurality of logical screens comprises a Picture-in-Picture screen.

20. The method of claim 16, wherein the plurality of logical screens comprises a Picture-outside-Picture screen.

* * * * *